United States Patent
Ohara et al.

(10) Patent No.: US 8,044,331 B2
(45) Date of Patent: Oct. 25, 2011

(54) IMAGE PICKUP APPARATUS AND METHOD FOR MANUFACTURING THE SAME

(75) Inventors: Naoto Ohara, Tokyo (JP); Yusuke Hayashi, Tokyo (JP)

(73) Assignee: Kyocera Corporation, Kyoto (JP)

( * ) Notice: Subject to any disclaimer, the term of this patent is extended or adjusted under 35 U.S.C. 154(b) by 348 days.

(21) Appl. No.: 12/372,871

(22) Filed: Feb. 18, 2009

(65) Prior Publication Data

US 2010/0044555 A1 Feb. 25, 2010

Related U.S. Application Data

(63) Continuation-in-part of application No. PCT/JP2007/066037, filed on Aug. 17, 2007.

(30) Foreign Application Priority Data

Aug. 18, 2006 (JP) .................. 2006-223651

(51) Int. Cl.
*G01J 1/20* (2006.01)

(52) U.S. Cl. .................. 250/201.9

(58) Field of Classification Search ............. 205/201.2, 205/201.9, 216; 395/299, 365, 363, 558, 395/737

See application file for complete search history.

(56) References Cited

U.S. PATENT DOCUMENTS

| | | | |
|---|---|---|---|
| 3,739,089 A | 6/1973 | Latall | |
| 5,664,243 A | 9/1997 | Okada et al. | |
| 5,748,371 A | 5/1998 | Cathey, Jr. et al. | |
| 6,021,005 A | 2/2000 | Cathey, Jr. et al. | |
| 6,069,738 A | 5/2000 | Cathey, Jr. et al. | |
| 6,148,528 A | 11/2000 | Jackson | |
| 6,233,060 B1 | 5/2001 | Shu et al. | |
| 6,241,656 B1 | 6/2001 | Suga | |
| 6,449,087 B2 | 9/2002 | Ogino | |
| 6,525,302 B2 | 2/2003 | Dowski, Jr. et al. | |
| 6,606,669 B1 | 8/2003 | Nakagiri | |
| 6,642,504 B2 | 11/2003 | Cathey, Jr. | |
| 7,158,660 B2 | 1/2007 | Gee et al. | |
| 7,400,393 B2 | 7/2008 | Shibata et al. | |
| 7,583,301 B2 | 9/2009 | Sakurai et al. | |

(Continued)

FOREIGN PATENT DOCUMENTS

JP S63-229851 A 9/1988

(Continued)

OTHER PUBLICATIONS

Edward R. Dowski, Jr., Gregory E. Johnson, Wavefront Coding: A modern method of achieving high performance and/or low cost imaging systems; CDM Optics, Inc., Boulder, Colorado, 1999.

(Continued)

*Primary Examiner* — Georgia Y Epps
*Assistant Examiner* — Renee Naphas
(74) *Attorney, Agent, or Firm* — Procopio, Cory, Hargreaves & Savitch LLP

(57) ABSTRACT

An image pickup apparatus and manufacturing method is disclosed. The image pickup apparatus comprises an optical system, an optical wavefront modulator that modulates an optical transfer function, an aperture adjacent to the optical wavefront modulator, and an image pickup device for detecting an object image passing through the optical system and the optical wavefront modulator. A product of a diameter of the aperture at a stop position multiplied by a distance between the aperture and the optical wavefront modulator is less than 2.

14 Claims, 39 Drawing Sheets

U.S. PATENT DOCUMENTS

| | | | |
|---|---|---|---|
| 7,630,584 | B2 | 12/2009 | Nose et al. |
| 7,719,772 | B2 * | 5/2010 | Mann et al. .................. 359/649 |
| 2002/0118457 | A1 | 8/2002 | Dowski |
| 2003/0076514 | A1 | 4/2003 | Gallagher et al. |
| 2003/0122926 | A1 * | 7/2003 | Kumei et al. .................. 348/65 |
| 2003/0158503 | A1 | 8/2003 | Matsumoto |
| 2004/0136605 | A1 | 7/2004 | Seger et al. |
| 2004/0190762 | A1 | 9/2004 | Dowski et al. |
| 2004/0257677 | A1 * | 12/2004 | Matsusaka .................. 359/783 |
| 2005/0128342 | A1 | 6/2005 | Izukawa |
| 2006/0012385 | A1 | 1/2006 | Tsao et al. |
| 2007/0086674 | A1 | 4/2007 | Guan |
| 2007/0268376 | A1 | 11/2007 | Yoshikawa et al. |
| 2007/0291152 | A1 | 12/2007 | Suekane et al. |
| 2008/0007797 | A1 | 1/2008 | Hayashi |
| 2008/0043126 | A1 | 2/2008 | Hayashi |
| 2008/0074507 | A1 | 3/2008 | Ohara et al. |
| 2008/0081996 | A1 | 4/2008 | Grenon et al. |
| 2008/0259275 | A1 | 10/2008 | Aoki et al. |
| 2008/0278592 | A1 | 11/2008 | Kuno et al. |

FOREIGN PATENT DOCUMENTS

| | | | |
|---|---|---|---|
| JP | H03-010380 | A | 1/1991 |
| JP | H03-175403 | A | 7/1991 |
| JP | H06-130267 | A | 5/1994 |
| JP | H08-128923 | A | 5/1996 |
| JP | H10-145667 | A | 5/1998 |
| JP | H11-261868 | A | 9/1999 |
| JP | 2000-050146 | A | 2/2000 |
| JP | 2000-098301 | A | 7/2000 |
| JP | 2000266979 | | 9/2000 |
| JP | 2000-275582 | A | 10/2000 |
| JP | 2001-257930 | A | 9/2001 |
| JP | 2001-346069 | A | 12/2001 |
| JP | 2002-027047 | A | 1/2002 |
| JP | 2002-127852 | A | 5/2002 |
| JP | 2002-221657 | A | 9/2002 |
| JP | 2003-185905 | A | 7/2003 |
| JP | 2003-244530 | A | 8/2003 |
| JP | 2003235794 | | 8/2003 |
| JP | 2003-248171 | A | 9/2003 |
| JP | 2003-262778 | A | 9/2003 |
| JP | 2003-283878 | A | 10/2003 |
| JP | 2004037733 | | 2/2004 |
| JP | 2004-147188 | A | 5/2004 |
| JP | 2004153497 | | 5/2004 |
| JP | 2004-328506 | A | 11/2004 |
| JP | 2005-326684 | A | 11/2005 |
| JP | 2006-139246 | A | 1/2006 |
| JP | 2006-049949 | A | 2/2006 |
| JP | 2006-094112 | A | 4/2006 |
| JP | 2006-154767 | A | 6/2006 |
| JP | 2006-308987 | A | 11/2006 |
| JP | 2007-060647 | A | 3/2007 |
| JP | 2007-300208 | A | 11/2007 |
| JP | 2008-017157 | A | 1/2008 |
| JP | 2008-035282 | A | 2/2008 |
| WO | 2006022373 | | 3/2006 |
| WO | 2007/013621 | A1 | 2/2007 |
| WO | 2007/074649 | A1 | 7/2007 |

OTHER PUBLICATIONS

Edward R. Dowski, Jr., Robert H. Cormack, Scott D. Sarama, Wavefront Coding: jointly optimized optical and digital imaging, CDM Optic, Inc., Boulder, Colorado, Army Research Laboratory, Adelphi, Maryland, 2000.

Office Action dated Mar. 10, 2010 issued for U.S. Appl. No. 11/773,792.

Final Office Action dated Aug. 18, 2010 issued for U.S. Appl. No. 11/773,792.

Office Action dated Jun. 10, 2010 issued for U.S. Appl. No. 11/861,217.

International Search Report dated May 12, 2009 issued by the Japanese Patent Office for International Application No. PCT/JP2009/056376.

Dowski, Edward R. Jr., et al., "Extended Depth of Field through Wave-Front Coding", Appl. Opt. vol. 34, p. 1859-1866 (1995).

* cited by examiner

STATE OF LIGHT BEAM IN OPTICAL SYSTEM

SPOT IMAGES OF OPTICAL SYSTEM

FIELD (0.000, 0.000)

DEFOCUS = 0.2 mm 0.4000 (mm)
CENTER OF GRAVITY (0.0000, 0.0000)

FIELD (0.000, 0.000)

BEST FOCUS 0.4000 (mm)
CENTER OF GRAVITY (0.0000, 0.0000)

FIELD (0.000, 0.000)

DEFOCUS = −0.2 mm 0.4000 (mm)
CENTER OF GRAVITY (0.0000, 0.0000)

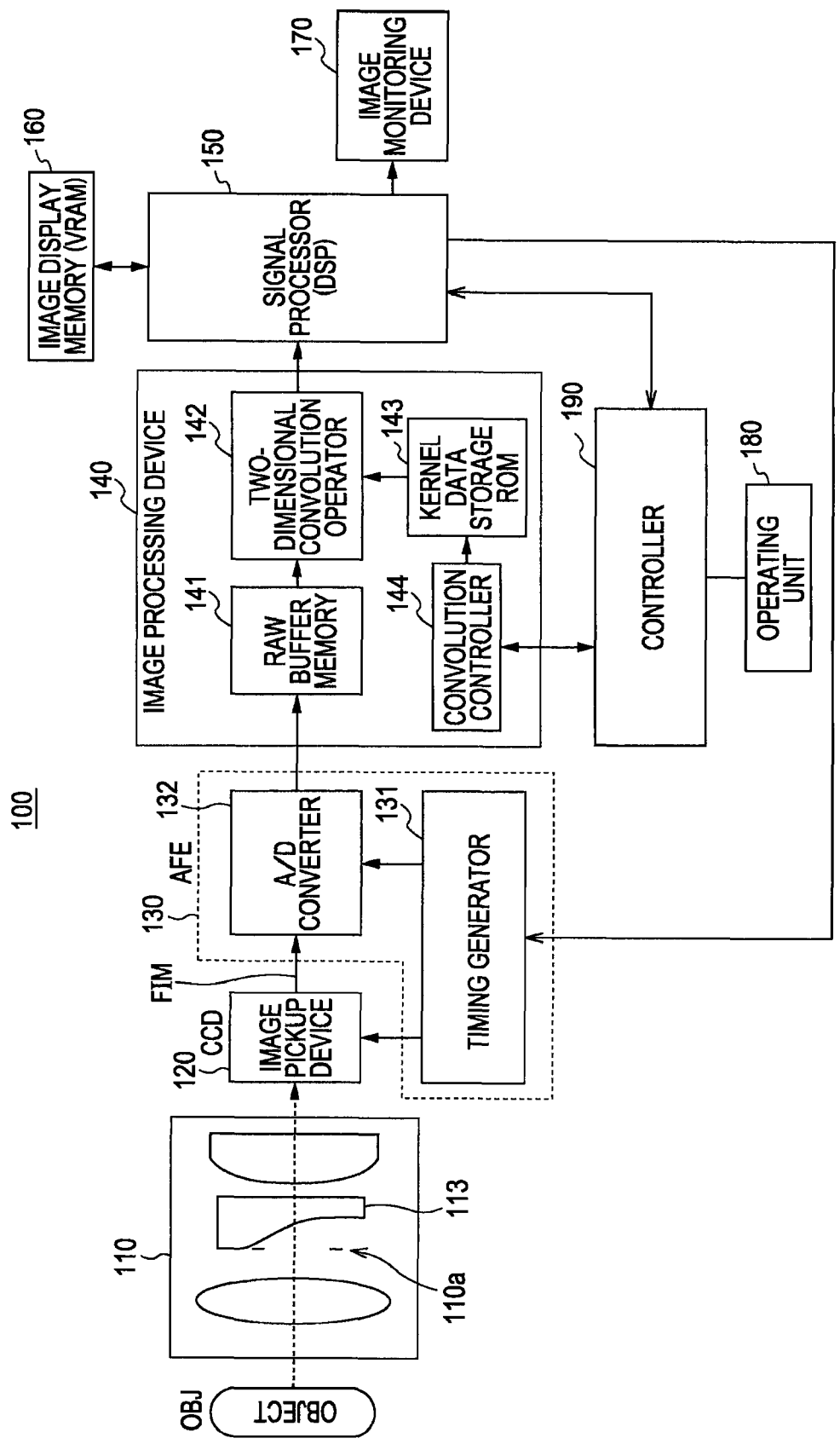

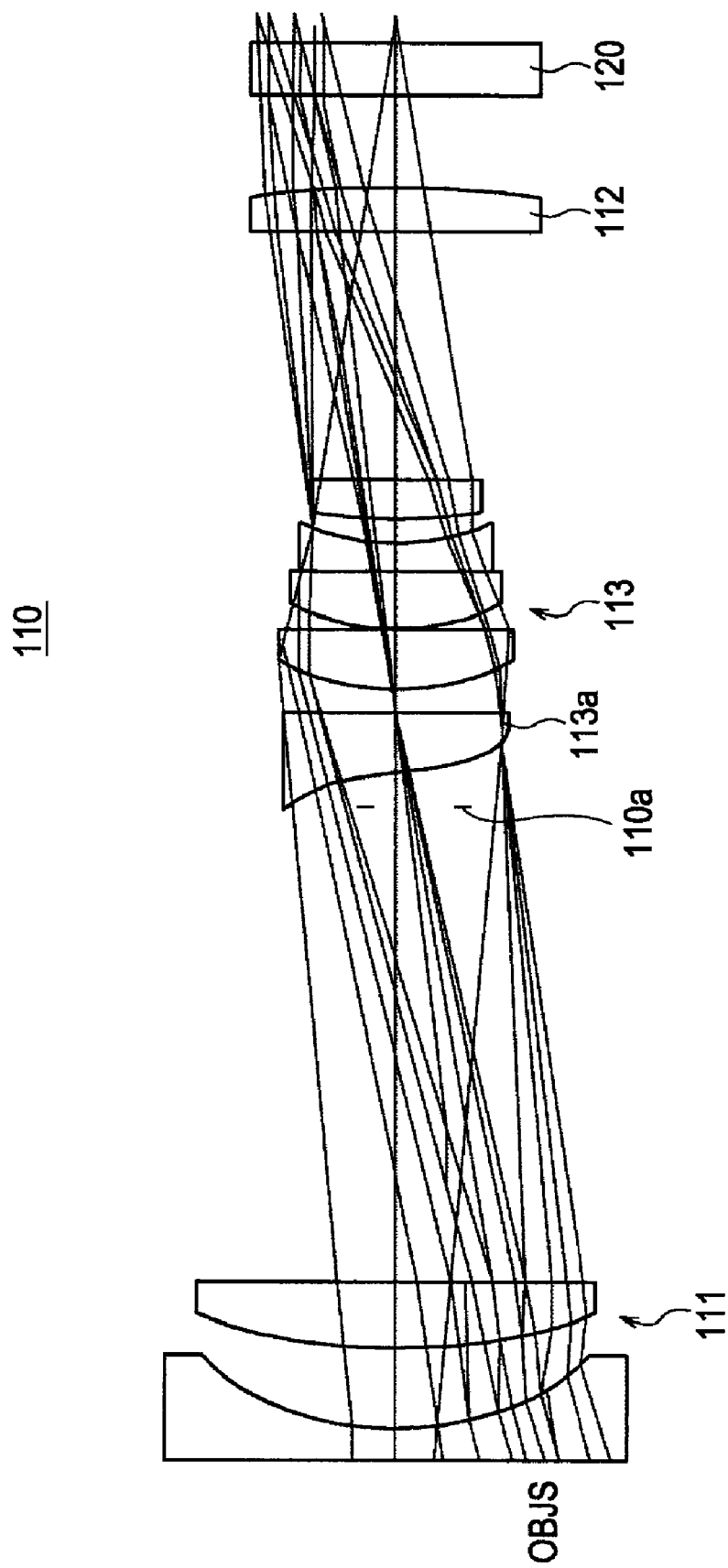

WIDE ANGLE

FOCAL POSITION  −40 μm  −20 μm  0 μm  20 μm  40 μm    ↕ SPOT SIZE 40 μm

TELEPHOTO

FOCAL POSITION  −40 μm  −20 μm  0 μm  20 μm  40 μm    ↕ SPOT SIZE 40 μm

FIELD (0.000, 0.000)

100.00

DEFOCUS = 0.2 mm

FIELD (0.000, 0.000)

100.00

BEST FOCUS

FIELD (0.000, 0.000)

100.00

DEFOCUS = −0.2 mm

APERTURE STOP IS CLOSE TO
PHASE MODULATION SURFACE

APERTURE STOP IS FAR FROM
PHASE MODULATION SURFACE

FIG. 12A
FIG. 12B
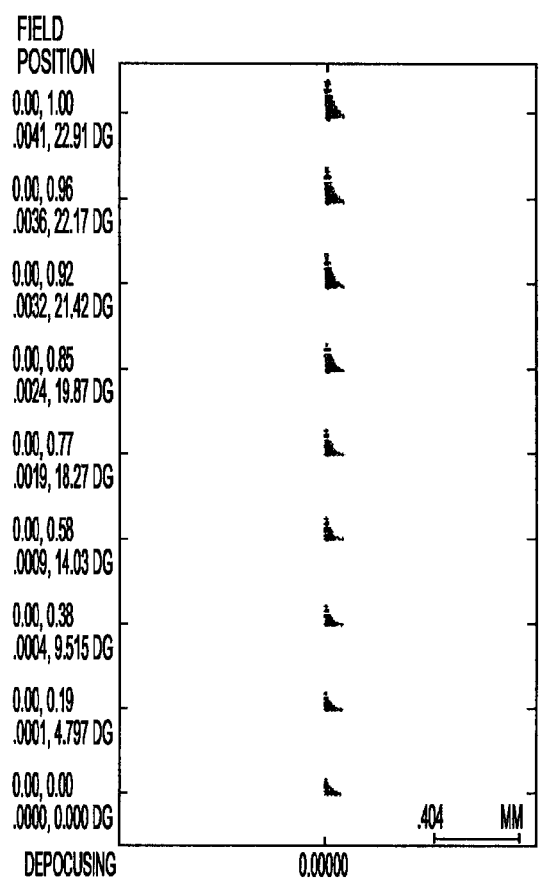
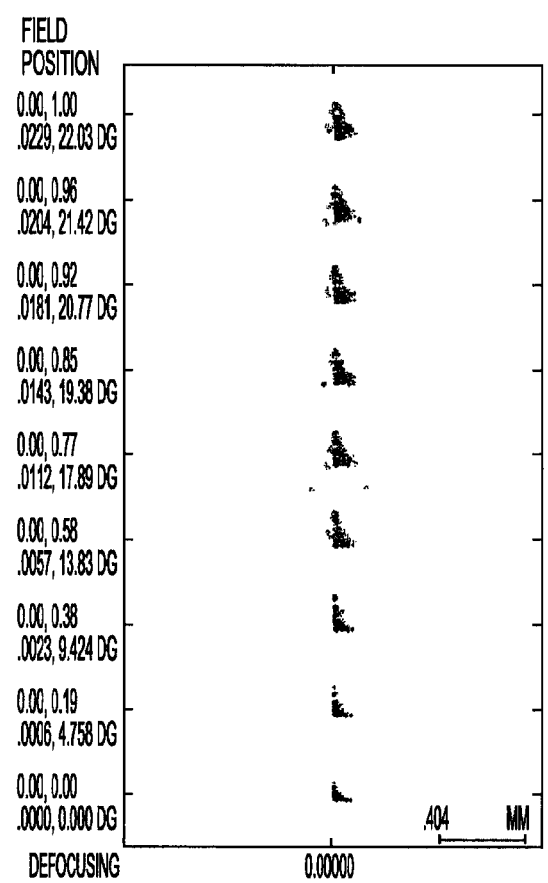
APERTURE STOP IS CLOSE TO
PHASE MODULATION SURFACE
APERTURE STOP IS FAR FROM
PHASE MODULATION SURFACE

CONDITIONAL
EXPRESSION 2
IS SATISFIED

S1 IS SMALL
(0.5 ≥ S1/S2)

S2 IS SMALL
(S1/S2 ≥ 2.0)

APERTURE STOP IS
TELECENTRIC

APERTURE STOP IS
NOT TELECENTRIC

CHART IMAGE AT FOCAL POSITION

POINT-IMAGE DISTRIBUTION FUNCTION OBTAINED BY PHASE SURFACE

CONTRAST VARIATION RELATIVE TO FOCAL POSITION IN KNOWN OPTICAL SYSTEM

CONTRAST VARIATION RELATIVE TO FOCAL POSITION IN OPTICAL SYSTEM OF PRESENT INVENTION

FIG. 36

EXAMPLE OF KERNEL DATA STORAGE ROM

| OPTICAL MAGNIFICATION | ×1.5 | ×5 | ×10 |
|---|---|---|---|
| KERNEL DATA | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FIG. 37

EXAMPLE OF KERNEL TABLE

| APERTURE STOP | F2.8 | F4 |
|---|---|---|
| KERNEL | A | B |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

FIG. 38

EXAMPLE OF KERNEL TABLE

| OBJECT DISTANCE INFORMATION | 100 mm | 500 mm | 4 m |
|---|---|---|---|
| KERNEL | A | B | C |

$$A = \begin{pmatrix} a & b \\ c & d \end{pmatrix}$$

$$B = \begin{pmatrix} a' & b' & c' \\ d' & e' & f' \\ g' & h' & i' \end{pmatrix}$$

$$C = \begin{pmatrix} a' & b' & c' & d' \\ e' & f' & g' & h' \\ i' & j' & k' & l' \\ m' & n' & o' & p' \end{pmatrix}$$

FILTER STRUCTURE

IMAGE PICKUP APPARATUS AND METHOD FOR MANUFACTURING THE SAME

CROSS-REFERENCE TO RELATED APPLICATION

This application is a continuation in part of PCT Application No. JP2007/066037, filed Aug. 17, 2007, which claims the benefit of Japanese Application No. 2006-223651, filed Aug. 18, 2006, both the content of which are incorporated by reference herein in their entirety.

FIELD OF INVENTION

The present disclosure generally relates to an image pickup apparatus, and more particularly relates to an image pickup apparatus which includes an image pickup device and an optical system.

BACKGROUND OF THE INVENTION

With the rapid development of digitalization of information, digitalization in image processing is increasingly required. In digital cameras in particular, solid-state image pickup devices, such as Charge Coupled Devices (CCD) and Complementary Metal Oxide Semiconductor (CMOS) sensors, have been mainly provided on imaging planes instead of films.

In image pickup apparatuses including CCDs or CMOS sensors, an image of an object is optically taken by an optical system and is extracted by an image pickup device in a form of an electric signal. Such apparatuses may be used in digital still cameras, video cameras, digital video units, personal computers, mobile phones, PDAs, image inspection apparatuses, industrial cameras used for automatic control, and the like.

FIG. 1 is a schematic diagram illustrating a structure of an existing image pickup apparatus 1 and traces of light ray bundles. The image pickup apparatus 1 comprises an optical system 2 and an image pickup device 3. The optical system 2 includes object-side lenses 21 and 22, an aperture stop 23, and an imaging lens 24 arranged in order from an object side (OBJS) toward the image pickup device 3. The image pickup device 3 may be a semiconductor sensor such as a CCD and a CMOS sensor.

The object-side lenses 21 and 22 focus the image of an object before the aperture stop 23, and the imaging lens 24 focuses the image of an object after the aperture stop 23. The optical system 2 may be telecentric.

Telecentricity is a special property of certain multi-element lens designs in which chief rays for all points across the object or image are collimated. A chief ray is any ray from an off-axis object point which passes through the center of the aperture stop 23 of the optical system 2. The chief ray enters the optical system 2 along a line directed toward the midpoint of the entrance pupil, and leaves the system along a line passing through the center of the exit pupil. For example, telecentricity occurs when the chief rays are parallel to the optical axis, in object and/or image space.

Another way of describing telecentricity is to state that the entrance pupil and/or exit pupil of the system is located at infinity. If the entrance pupil is at infinity, the lens is object-space telecentric. If the exit pupil is at infinity, the lens is image-space telecentric. If both pupils are at infinity, the lens is double telecentric. For many applications, telecentricity is desirable because it provides nearly constant magnification over a range of working distances, virtually eliminating perspective angle error. This means that object movement does not affect image magnification.

A telecentric lens is a compound lens with an unusual geometric property in how it forms images. The defining property of a telecentric system is the location of the entrance pupil or exit pupil at infinity. This means that the chief rays (oblique rays which pass through the center of the aperture stop 23) are parallel to the optical axis in front of or behind the system, respectively. The simplest way to make a lens telecentric is to put the aperture stop 23 at one of the lens's focal points.

The aperture stop 23 can limit the light that traverses the optical system 2. The optical system 2 typically may have many openings, or structures that can limit the ray bundles (ray bundles are also known as pencils of light). These structures may be the edge of a lens or mirror, or a ring or other fixture that holds an optical element in place, or may be a special element such as a diaphragm placed in the optical path to limit the light admitted by the system. In general, these structures are called stops, and the aperture stop 23 is the stop that determines a ray cone angle, or equivalently the brightness, at an image point.

In some contexts, the term aperture may refer to a diameter of the aperture stop 23 rather than the physical stop or the opening itself. For example, in a telescope the aperture stop is typically the edges of the objective lens or mirror (or of the mount that holds it). One then speaks of a telescope as having, for example, a 100 centimeter aperture. Note that the aperture stop is not necessarily the smallest stop in the system. Magnification and demagnification by lenses and other elements can cause a relatively large stop to be the aperture stop for the system.

In optics, an aperture is a hole or an opening through which light is admitted. More specifically, the aperture of an optical system 2 is the opening that determines the cone angle of a bundle of rays that come to a focus in the image plane. The aperture determines how collimated the admitted rays are, which is of great importance for the appearance at the image plane. If the admitted rays also pass through a lens, highly collimated rays (narrow aperture) will result in sharpness at the image plane, while uncollimated rays (wide aperture) will result in sharpness for rays with the right focal length only. This means that a wide aperture results in an image that is sharp around what the lens is focusing on and blurred otherwise. The aperture also determines how many of the incoming rays are actually admitted and thus how much light that reaches the image plane (the narrower the aperture, the darker the image).

The term stop is sometimes confusing due to its multiple meanings. A stop can be a physical object: an opaque part of an optical system 2 that blocks certain rays. The aperture stop 23 is the aperture that limits the brightness of the image by restricting the input pupil size, while a field stop is a stop intended to cut out light that would be outside the desired field of view and might cause flare or other problems if not stopped.

In photography, stops are also a unit used to quantify ratios of light or exposure, with one stop meaning a factor of two, or one-half. The one-stop unit is also known as the EV (exposure value) unit. On a camera, the f-number is usually adjusted in discrete steps, known as f-stops. Each "stop" is marked with its corresponding f-number, and represents a halving of the light intensity from the previous stop. This corresponds to a decrease of the pupil and aperture diameters by a factor of $\sqrt{2}$ or about 1.414, and hence a halving of the area of the pupil.

In optics, the f-number (also called Fno, f-stop, focal ratio, f-ratio, or relative aperture) of an optical system 2 expresses the diameter of the entrance pupil in terms of the focal length of the lens; in simpler terms, the f-number is the focal length divided by the "effective" aperture diameter. It is a dimensionless number that is a quantitative measure of lens speed, an important concept in photography.

Referring to FIG. 1, in the image pickup apparatus 1, the best-focus plane coincides with the plane on which the image pickup device is disposed. FIG. 2A to 2C illustrate spot images formed on a light-receiving surface of an image pickup device 3 in the image pickup apparatus 1 shown in FIG. 1 when a focal point is displaced by 0.2 mm (Defocus=0.2 mm), when the focal point is not displaced (Best focus) or when the focal point is displaced by −0.2 mm (Defocus=−0.2 mm), individually.

An image pickup apparatus, in which light is regularly dispersed by a phase plate and is reconstructed by digital processing to achieve a large depth of field, has been suggested. Furthermore, an automatic exposure control system for a digital camera in which a filtering process using a transfer function is performed has also been suggested.

As a focusing method, a so-called hill-climbing autofocus (AF) method is known in which a focal position is determined by acquiring a peak value of contrast.

In the image pickup apparatuses shown in FIG. 1, it is assumed that a Point Spread Function (PSF) obtained is constant when the above-described phase plate is placed in the optical system 2. The point spread function (PSF) describes the response of an imaging system to a point source or point object. The degree of spreading (blurring) of the point object is a measure for the quality of an imaging system.

If the PSF varies, it can be difficult to obtain an image with a large depth of field by convolution using a kernel. Therefore, setting single focus lens systems aside, in lens systems like zoom systems and autofocus (AF) systems, there is a large problem in adopting previous structures because high precision is required in the optical design, thereby increasing costs accordingly. More specifically, in known image pickup apparatuses, a suitable convolution operation cannot be performed and the optical system 2 should be designed to eliminate aberrations, such as astigmatism, coma aberration, and zoom chromatic aberration that cause a displacement of a spot image at wide angle and telephoto positions. However, eliminating the aberrations, can increase the complexity of the optical design, the number of design steps, the costs, and the lens size. In addition, in the known image pickup apparatuses, for example, in the case where a bright object is shot, a phase of a phase modulation element varies when the aperture stop 23 is moved away from the phase modulation element.

If the aperture stop 23 is moved away from the phase modulation element while the system is not telecentric, it may distort the reconstructed image. In addition, the PSF may vary and the image reconstruction can become difficult unless the incident angle at which the light rays are incident on the image pickup device is controlled.

Accordingly, there is a need for an image pickup apparatus operable to simplify an optical system, reducing the costs, and obtaining a reconstruction image which has an appropriate image quality in which the influence of noise is small.

SUMMARY

An image pickup apparatus and manufacturing method is disclosed. The image pickup apparatus comprises an optical system, an optical wavefront modulator that modulates an optical transfer function (OTF), an aperture adjacent to the optical wavefront modulator, and an image pickup device for detecting an object image passing through the optical system and the optical wavefront modulator. A product of a diameter $\phi$ of the aperture at a stop position (aperture stop) multiplied by a distance D between the aperture stop and the optical wavefront modulator is less than 2.

A first embodiment comprises an image pickup apparatus. The apparatus comprises an optical system, and an optical wavefront modulation element configured to modulate an optical transfer function (OTF). The apparatus further comprises an aperture stop located adjacent to the optical wavefront modulation element, and an image pickup device configured to pick up an object image that passes through the optical system and the optical wavefront modulation element. A product of a diameter $\phi$ of the aperture at a stop position multiplied by a distance D between the aperture stop and the optical wavefront modulator is less than 2 ($\phi \times D < 2$).

A second embodiment comprises a method of manufacturing an image pickup apparatus. The method comprises providing an optical wavefront modulation element and providing an aperture stop. The method further comprises locating the optical wavefront modulation element near the aperture stop such that a $\phi \times D < 2$ condition is satisfied, where $\phi$ is an aperture diameter of the aperture stop, and D is a distance between the aperture stop and the optical wavefront modulation element.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

FIG. 3 is a block diagram illustrating the structure of an image pickup apparatus according to an embodiment of the disclosure.

FIG. 4 is a schematic diagram illustrating an exemplary zoom optical system at a wide-angle position in an image pickup apparatus according to an embodiment of the disclosure.

FIG. 10A illustrates a spot image formed on the light-receiving surface of the image pickup device included in the image pickup apparatus, while FIG. 10B illustrates the MTF characteristic with respect to spatial frequency.

FIG. 11A is an exemplary diagram showing a state in which the aperture stop is close to the phase modulation surface.

FIG. 11B is an exemplary diagram showing a state in which the aperture stop is far from the phase modulation surface.

FIGS. 12A and 12B are diagrams illustrating spot images formed by the DEOS in the states in which the aperture stop is located at different positions. FIG. 12A is an exemplary diagram showing spot images obtained when the aperture stop is close to the phase modulation surface, and FIG. 12B is an exemplary diagram showing spot images obtained when the aperture stop is far from the phase modulation surface.

FIG. 36 is a diagram illustrating an exemplary of data stored in a kernel data ROM (optical magnification) according to an embodiment of the disclosure.

FIG. 37 is a diagram illustrating another exemplary of data stored in a kernel data ROM (F number) according to an embodiment of the disclosure.

FIG. 38 is a diagram illustrating another exemplary of data stored in a kernel data ROM (F number) according to an embodiment of the disclosure.

DETAILED DESCRIPTION OF EXEMPLARY EMBODIMENTS

Figure 1:
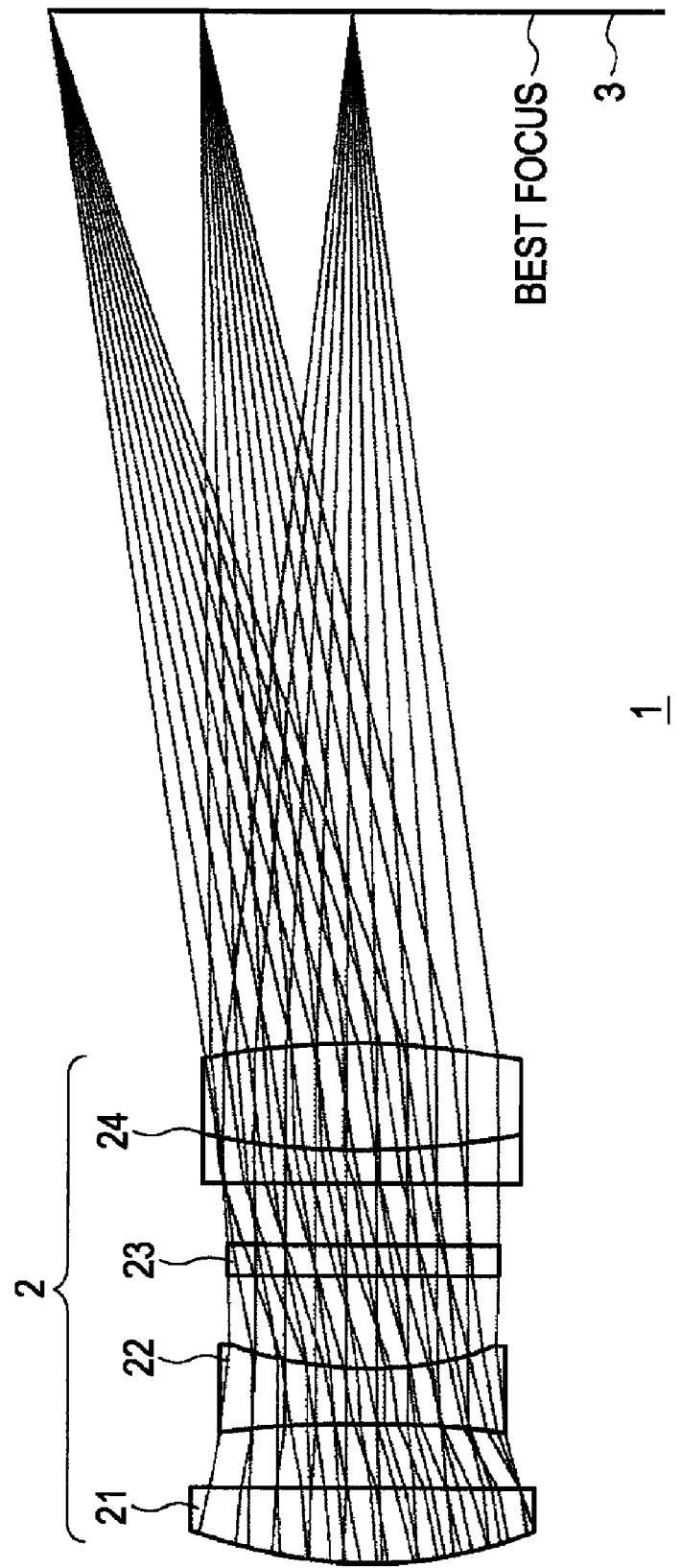
FIG. 1 is a schematic diagram illustrating the structure of an existing image pickup apparatus and traces of light ray bundles.
Figure 2A:
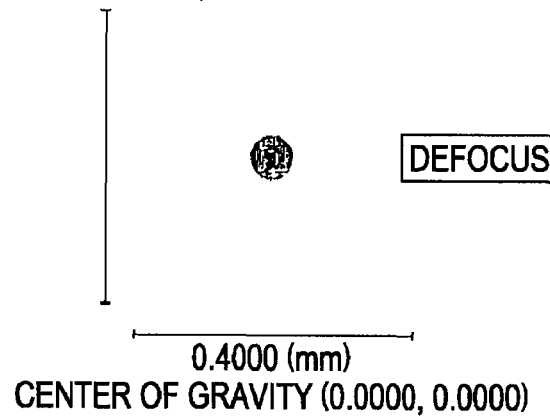
FIG. 2A illustrates spot images formed on a light-receiving surface of an image pickup device in the image pickup apparatus shown in FIG. 1 when a focal point is displaced by 0.2 mm (Defocus=0.2 mm).
Figure 2B:
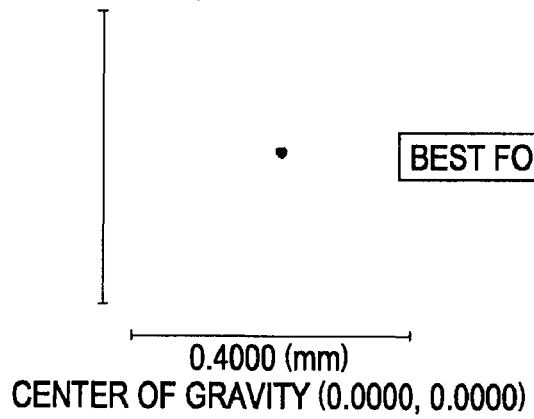
FIG. 2B illustrates spot images formed on a light-receiving surface of an image pickup device in the image pickup apparatus shown in FIG. 1 when the focal point is not displaced (Best focus).
Figure 2C:
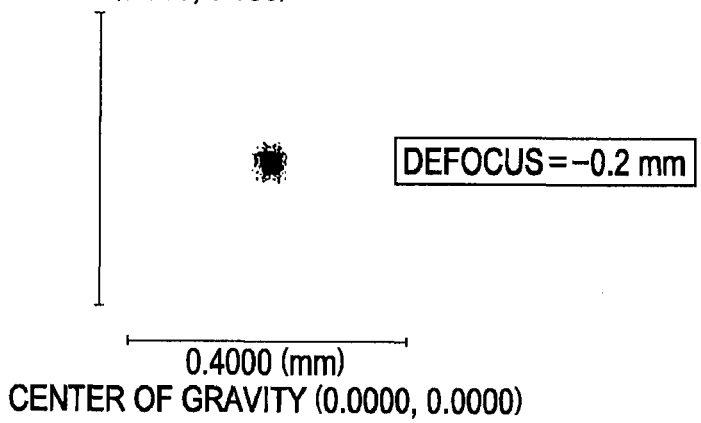
FIG. 2C illustrates spot images formed on a light-receiving surface of an image pickup device in the image pickup apparatus shown in FIG. 1 when the focal point is displaced by −0.2 mm (Defocus=−0.2 mm).

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present disclosure should be accorded scope consistent with the claims, and not limited to the examples described and shown herein.

Embodiments of the invention are described herein in the context of one practical non-limiting application, namely, a zoom system of a digital camera. Embodiments of the disclosure, however, are not limited to such digital camera applications, and the techniques described herein may also be utilized in other applications of optical systems. For example, embodiments may be applicable to optical lithography.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

The following description is presented to enable a person of ordinary skill in the art to make and use the invention. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described herein and shown, but is to be accorded the scope consistent with the claims.

FIG. 3 is a block diagram illustrating the structure of an image pickup apparatus 100 according to an embodiment of the disclosure. The image pickup apparatus 100 may comprise an optical system 110, an image pickup device 120, an analog front end (AFE) unit 130, an image processing device 140, a camera signal processor 150, an image display memory 160, an image monitoring device 170, an operating unit 180, and a controller 190.

The optical system 110 is configured to supply an image obtained by shooting an object (OBJ) to the image pickup device 120. The optical system 110 may include an aperture stop 110a and an optical wavefront modulation element 113 which modulates an optical transfer function (OTF). The aperture stop 110a may be a variable aperture that can vary in diameter from, without limitation, complete closure to many millimeters. The aperture stop 110a and optical wavefront modulation element 113 are explained in more detail below.

The image pickup device 120 may include a CCD or a CMOS sensor on which the image received from the optical system 110 is formed and which outputs first image information representing the image formed thereon to the image processing device 140 via the AFE unit 130 as a first image electric signal (FIM). In the embodiment shown in FIG. 3, a CCD is shown as an example of the image pickup device 120.

A focal position can be adjusted by moving to a focal position corresponding to a predetermined object distance using a contrast of the object based on an image signal. The image signal is repeatedly detected through the optical system 110.

The AFE unit 130 may include a timing generator 131 and an analog/digital (A/D) converter 132. The timing generator 131 generates timing for driving the CCD in the image pickup device 120. The A/D converter 132 converts an analog signal input from the CCD into a digital signal, and can output the thus-obtained digital signal to the image processing device 140.

The image processing device 140 (e.g., a digital signal processor (DSP)) can receive the digital signal representing the picked-up image from the AFE unit 130, subject the signal to a two-dimensional convolution process, and output the result to the camera signal processor 150. The image processing device 140 is operable to perform a filtering process of the optical transfer function (OTF) on the basis of exposure information obtained from the controller 190. The exposure information may include, without limitation, aperture information. The image processing device 140 is operable to generate an image signal with a smaller dispersion than that of a dispersed object-image signal that is obtained from the image pickup device 120. In addition, the image processing device 140 is operable to perform noise-reduction filtering. The image processing device 140 can also perform a filtering process of the optical transfer function (OTF) and improving the contrast.

As shown in FIG. 3, the image processing device 140 includes a RAW buffer memory 141, a two-dimensional convolution operator unit 142, a kernel data storage ROM 143 that functions as memory means, and a convolution controller 144. The convolution controller 144 is controlled by the controller 190 so as to turn on/off the convolution process, control the screen size, switch kernel data and so on.

The signal processor 150, the kernel data storage ROM 143 of the image processing device 140, and processes performed by the image processing device 140, are described in more detail below in the context of FIGS. 40-43.

The camera signal processor (DSP) 150 is operable to perform, without limitation, processes including color interpolation, white balancing, YCbCr conversion, compression, filing, etc., stores data in the memory 160, and displays images on the image monitoring device 170.

The controller 190 is operable to perform exposure control, receive operation inputs from the operating unit 180 and the like, and determine the overall operation of the system on the basis of the received operation inputs. Thus, the controller 190 can control the AFE unit 130, the image processing device 140, DSP 150, the aperture stop 110a, and the like, so as to perform arbitration control of the overall system.

Figure 5:
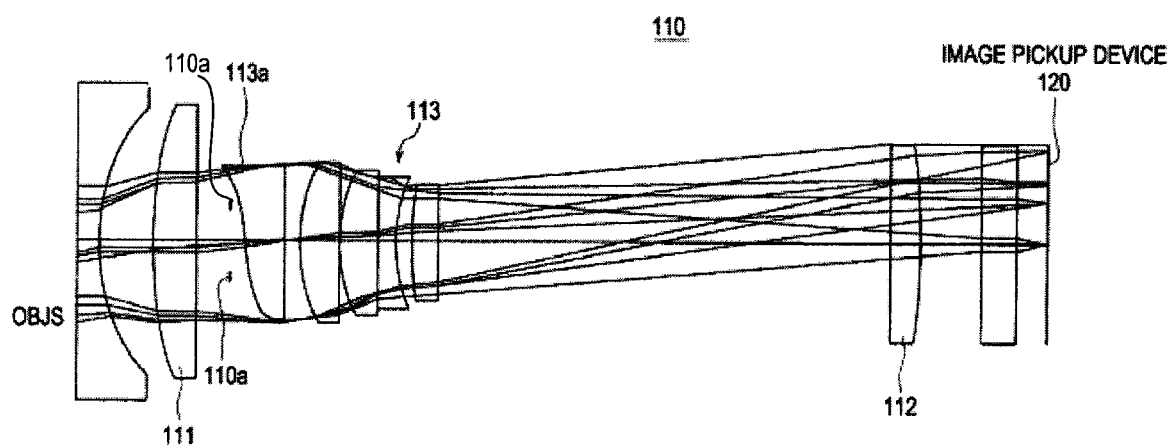
FIG. 5 is a schematic diagram illustrating an exemplary zoom optical system at a telephoto position in the image pickup apparatus comprising the zoom function according to an embodiment of the disclosure.
Figure 6:
FIG. 6 is an exemplary diagram illustrating the shapes of spot images formed at the image height center at the wide-angle position.
Figure 7:
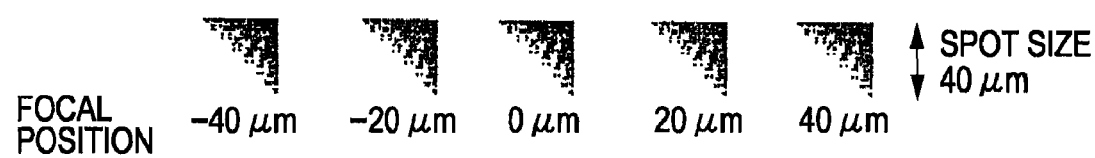
FIG. 7 is an exemplary diagram illustrating the shapes of spot images formed at the image height center at the telephoto position.

FIG. 4 is a schematic diagram illustrating an exemplary zoom optical system 110 at a wide-angle position in an image pickup apparatus according to an embodiment of the disclosure. In addition, FIG. 5 is a schematic diagram illustrating an exemplary zoom optical system 110 at a telephoto position in an image pickup apparatus having a zoom function according to another embodiment of the disclosure. FIG. 6 is an exemplary diagram illustrating the shapes of spot images formed at the image height center at the wide-angle position (FIG. 4) and FIG. 7 is an exemplary diagram illustrating the shapes of spot images formed at the image height center at the telephoto position (FIG. 5).

FIGS. 4 and 5 show an example of an optical system, and an optical system according to the present invention is not limited to that shown in FIGS. 4 and 5. In addition, FIGS. 6 and 7 show examples of spot shapes, and the spot shapes of the present embodiment are not limited to those shown in FIGS. 6 and 7.

Referring to FIGS. 4 and 5, the zoom optical system 110 comprises an object-side lens 111 located at the object side (OBJS), an imaging lens 112 operable to form an image on the image pickup device 120, a phase plate 113a (optical phase plate), and an optical wavefront modulation element 113.

An aperture stop 110a (in FIGS. 4 and 5) is also placed between the object-side lens 111 and the imaging lens 112. In the present embodiment, for example, the aperture stop 110a is located next to a phase modulation surface 113b (optical wavefront modulation surface) (FIGS. 11A and 11B) of the optical wavefront modulation element 113 (group) with a distance D (FIG. 11B) there between. According to an embodiment, the aperture size (opening) of the aperture stop 110a can be controlled by an exposure control device.

The optical wavefront modulation element 113 may, without limitation, comprise a single optical lens, or a group of optical lenses. The optical wavefront modulation element 113 may be referred to by may terms such as the following: phase modulation element, wavefront modulation element, wavefront coding optical element, wavefront modulation element group, wavefront modulation optical element, and optical wavefront modulation element group.

The optical wavefront modulation element 113 is placed between the object-side lens 111 and the imaging lens 112, and is operable to change the wavefront shape of light that passes through the imaging lens 112 to form an image on a light-receiving surface of the image pickup device 120.

The optical wavefront modulation element 113 may be any type of optical wavefront modulation element 113 (or group) as long as the wavefront shape can be changed. For example, the optical wavefront modulation element 113 may be, without limitation, an optical element having a varying thickness such as a phase plate having a three-dimensional curved surface, and/or an optical element having a varying refractive index such as a gradient index wavefront modulation lens. For another example, the optical wavefront modulation element 113 may be, without limitation, an optical element having a coated lens surface or the like so as to have varying thickness and refractive index such as a wavefront modulation hybrid lens or state in which the optical wavefront modulation element 113 is formed as a phase surface on the lens surface. For a further example, the optical wavefront modulation element 113 may be, without limitation, a liquid crystal device capable of modulating the phase distribution of light such as a liquid-crystal spatial phase modulation device. In this example, the optical wavefront modulation element 113 comprises a phase plate having a three-dimensional curved surface.

The zoom optical system 110 in embodiments shown in FIGS. 4 and 5 can be obtained by placing the phase plate 113a in a 3× zoom system of a digital camera. The phase plate 113a is an optical lens by which light converged by an optical system is regularly blurred. Due to inserting the phase plate 113a, an out of focus image at any point thereof can be formed on the detector 120. In other words, the phase plate 113a can form light with a large depth of field (which plays a major role in image formation) and flares (blurred portions).

According to an embodiment, a regularly dispersed image is obtained using a phase plate 113a as the optical wavefront modulation element 113. However, lenses included in optical systems that can form a regularly dispersed image similar to that obtained by the optical wavefront modulation element 113 may also be used. In such a case, the optical wavefront modulation element 113 can be omitted from the optical system 110. Therefore, instead of dealing with dispersion caused by the phase plate 113a as described below, dispersion caused by the optical system 110 can be dealt with.

According to an embodiment, a wavefront-aberration-control optical system or a Depth Expansion Optical System (DEOS) is used to obtain a high-definition image. In this manner the structure of the optical system 110 can be simplified, and the costs can be reduced.

The DEOS is operable to perform digital signal processing of the regularly blurred image so as to reconstruct a focused image as described below. The image processing may be performed by the image processing device 140.

Figure 8:
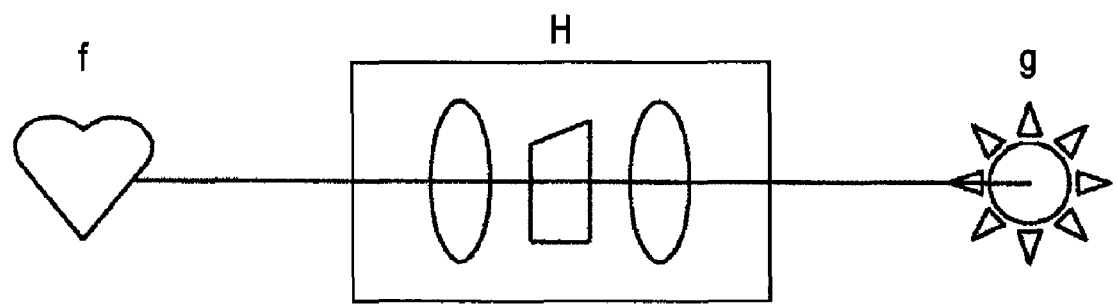
FIG. 8 is an exemplary diagram illustrating the principle of a Depth Expansion Optical System (DEOS).

As shown in FIG. 8, when an object image f is supplied to the DEOS H (i.e., where H is a transfer function matrix), an image g is generated. This process can be expressed by the following equation:

$g = H * f$ where "*" indicates convolution.

The object can be obtained from the generated image g, based on the following relationship:

$f = H^{-1} * g$

A kernel size and a coefficient of the H function are described below. Hn, Hn−1, . . . indicate the respective H functions. Since the corresponding spot images differ from each other, the H functions can be expressed as follows:

$$Hn = \begin{pmatrix} a & b & c \\ d & e & f \end{pmatrix}$$

$$Hn-1 = \begin{pmatrix} a' & b' & c' \\ d' & e' & f' \\ g' & h' & i' \end{pmatrix}$$

The difference in the number of rows and/or columns in the matrices is called the kernel size, and each of the coefficients of the matrices are refer to below as "the coefficient".

Each of the H functions (Hn, . . . , Hn−1) may be stored in a memory. In one embodiment, the PSF may be set and be calculated as a function of the object distance. The H function can then be calculated so that a filter optimum for an arbitrary object distance can be obtained. In another embodiment, the H function itself may be set as a function of object distance, and be directly determined from the object distance.

For example, in the embodiment shown in FIG. 3, the image taken by the optical system 110 is picked up by the image pickup device 120, and is input to the image processing device 140 when the aperture is open. The image processing device 140 acquires a coefficient of the H function matrix that corresponds to the optical system 110 and generates an image signal with a smaller blur than that of the blurred-image signal from the image pickup device 120 using the acquired coefficient.

The term "blur" refers to the phenomenon in which an image that is not in focus at any point thereof is formed on the image pickup device 120 due to the phase plate 113a, and in which light with a large depth of field (which plays a major role in image formation) and flares (blurred portions) are therefore formed by the phase plate 113a. Since the image is blurred and blurred portions are formed, the term "blur" has a meaning similar to that of "aberration". Therefore, in this embodiment, blur is sometimes explained as aberration, herein.

Features of the DEOS are described in more detail below.

Figure 9A:
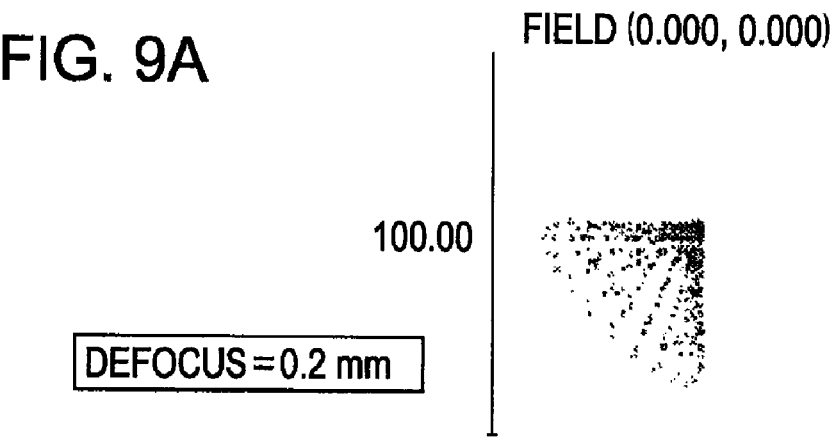
FIG. 9A illustrates spot images formed on a light-receiving surface of an image pickup device according to one or more embodiments when a focal point is displaced by 0.2 mm (Defocus=0.2 mm).
Figure 9B:
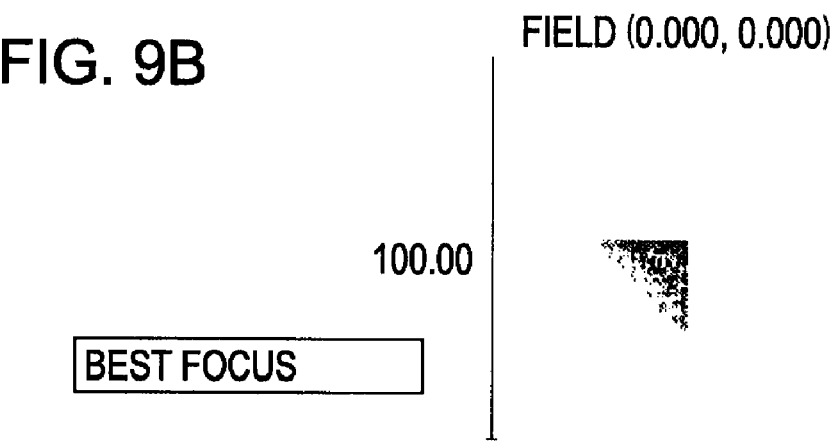
FIG. 9B illustrates spot images formed on a light-receiving surface of an image pickup device according to one or more embodiments when the focal point is not displaced (Best focus).
Figure 9C:
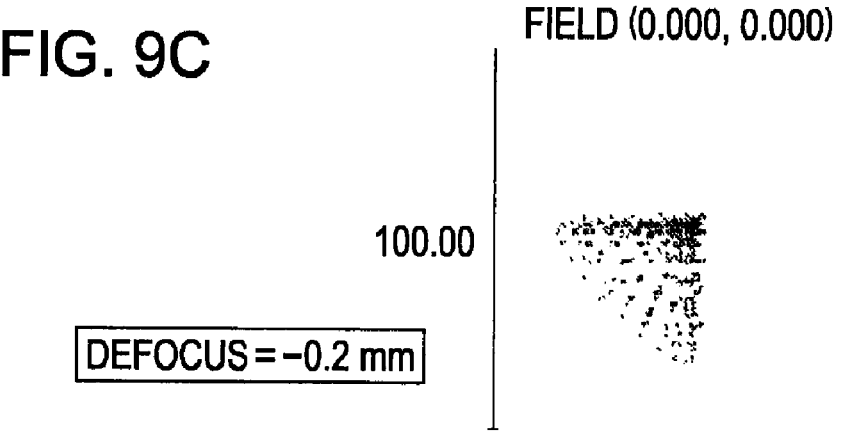
FIG. 9C illustrates spot images formed on a light-receiving surface of an image pickup device according to one or more embodiments when the focal point is displaced by −0.2 mm (Defocus=−0.2 mm).

FIGS. 9A to 9C illustrate spot images formed on the light-receiving surface of the image pickup device 120 according to one or more embodiments to the disclosure. FIG. 9A shows the spot image obtained when the focal point is displaced by 0.2 mm (Defocus=0.2 mm). FIG. 9B shows the spot image obtained when the focal point is not displaced (Best focus). FIG. 9C shows the spot image obtained when the focal point is displaced by −0.2 mm (Defocus=−0.2 mm).

As shown in FIGS. 9A to 9C, in the image pickup apparatus 100 according to the present embodiment, light flux with a large depth of field (which plays a major role in image formation) and flares (blurred portions) are formed by an optical wavefront modulation element 113 (wavefront coding optical element) including the phase plate 113a.

Thus, the first image FIM (as discussed above in the context of FIG. 3) formed by the image pickup apparatus 100 according to the present embodiment is in light conditions with a very large depth of field.

Figure 10A:
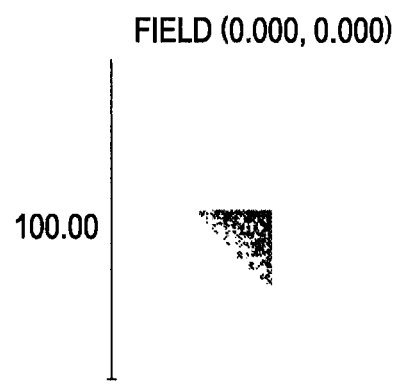
FIGS. 10A and 10B illustrate exemplary diagrams showing a Modulation Transfer Function (MTF) of a first image formed by the image pickup device.
Figure 10B:
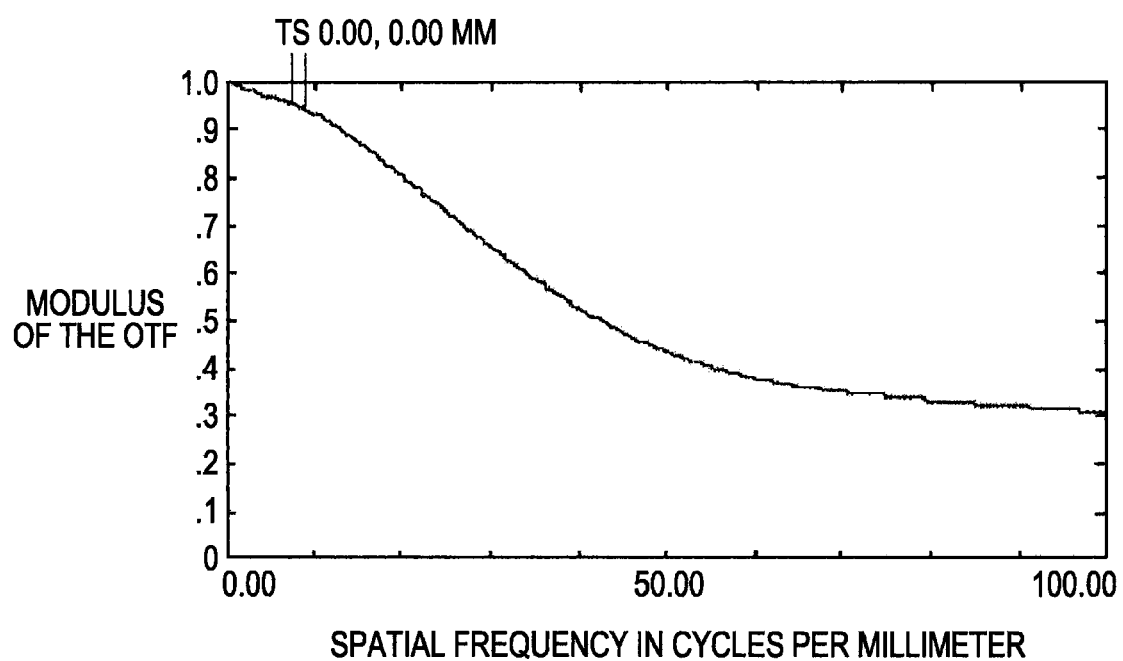

FIGS. 10A and 10B are exemplary diagrams illustrating a Modulation Transfer Function (MTF) of the first image formed by the image pickup apparatus 100 lenses according to the present embodiment. FIG. 10A shows a spot image formed on the light-receiving surface of the image pickup device 120 included in the image pickup lens apparatus (imaging lens 112). FIG. 10B shows the MTF characteristic with respect to spatial frequency.

In the present embodiment, a final, high-definition image is obtained by a correction process performed by the image processing device 140 including, for example, a Digital Signal Processor (DSP). Therefore, as shown in FIGS. 10A and 10B, the MTF of the first image is substantially low.

If the position of the aperture stop 110a is not taken into account, the position at which the light ray at each image height passes through the optical wavefront modulation element 113 (phase modulation element) varies in accordance with the position of the aperture stop 110a and thus the phase varies accordingly. Therefore, it becomes difficult to reconstruct a suitable image.

Therefore, according to an embodiment, the aperture stop 110a in the DEOS is located in proximity to the optical wavefront modulation element 113 so as to satisfy conditional expression (1) given below:

$$\phi \times D < 2 \tag{1}$$

where ϕ is the aperture diameter of the aperture stop 110a (see FIG. 11B), and D is the distance between the aperture stop 110a and the phase modulation surface 113b (wavefront modulation surface) of the phase plate 113a of the optical wavefront modulation element 113.

In this manner, the lens system in the DEOS is designed based on the position of the aperture stop 110a such that conditional expression (1) is satisfied.

Figure 11A:
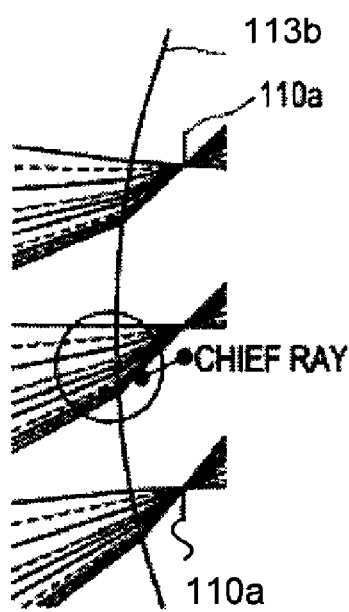
FIGS. 11A and 11B are diagrams illustrating light rays in the phase modulation section of the DEOS in the states in which the aperture stop located is at different positions.
Figure 11B:
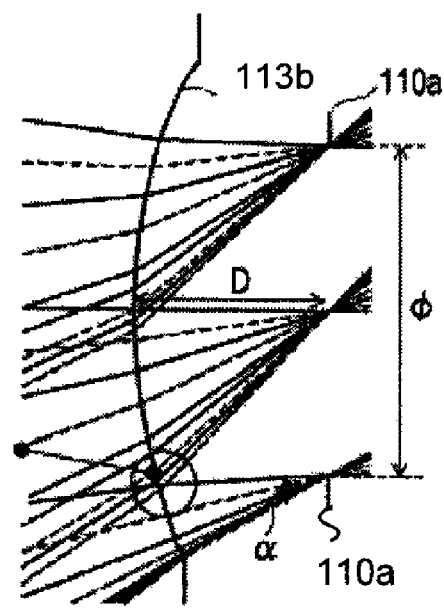

FIGS. 11A and 11B are exemplary diagrams illustrating light rays in the phase modulation section of the DEOS in states in which the aperture stop 110a is at different positions. FIG. 11A shows the state in which the aperture stop 110a is close to the phase modulation surface 113b, and FIG. 11B shows the state in which the aperture stop 110a is far from the phase modulation surface 113b.

As shown in FIGS. 11A and 11B, the positions at which the light rays pass through the phase modulation surface 113b differ depending on the position of the aperture stop 110a. If the aperture diameter ϕ of the aperture stop 110a is maintained constant in conditional expression (1), the positions at which the chief ray at the diagonal image height and the axial chief ray pass through the phase modulation surface 113b in the state in which the aperture stop 110a is far from the phase modulation surface 113b differ from those in the state in which the aperture stop 110a is close to the phase modulation surface 113b.

In the embodiment shown in FIGS. 11A and 11B, when the aperture stop 110a is far from the phase modulation surface 113b, the outermost chief ray and the Fno (FIG. 11C) ray pass through the phase modulation surface 113b at substantially the same position.

Figure 11C:
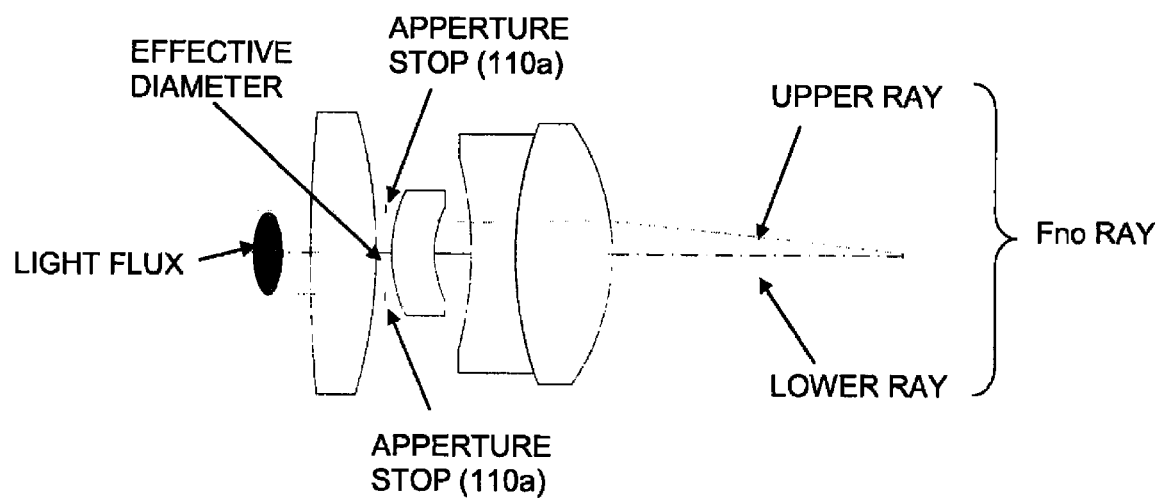
FIG. 11C is an illustration of exemplary upper and lower Fno rays, where an Fno ray represents the surface of the light flux which passes through one or more lenses.

FIG. 11C illustrates an upper Fno ray (upper ray) and a lower Fno ray (lower ray). An Fno ray represents the surface of the light flux which passes through one or more lenses. In addition, when the optical axis is defined as a z axis and two axes that are perpendicular to the z axis and to each other are defined as x and y axes, the outermost line of the light represents Fno ray in the y-z plane or x-z plane, and specifically, as shown in FIG. 11C, an upper ray and a lower ray represent upper and lower lines of the Fno ray respectively.

FIGS. 12A and 12B are exemplary diagrams illustrating spot images formed by the DEOS in the states in which the aperture stop 110a is located at different positions. FIG. 12A shows the spot images obtained when the aperture stop 110a is close to the phase modulation surface 113b, and FIG. 12B shows the spot images obtained when the aperture stop 110a is far from the phase modulation surface 113b.

FIGS. 12A and 12B illustrate the spot images formed by the light rays that pass through the phase modulation surface 113b as explained above. As shown in FIGS. 12A and 12B, the degree of deformation of the spot images in the state in which the aperture stop 110a is far from the phase modulation surface 113b is higher than that in the state in which the aperture stop 110a is close to the phase modulation surface 113b. When the spot images are deformed, it becomes difficult to reconstruct the images.

In contrast, in a case where the distance between the aperture stop 110a and the phase modulation surface 113b is maintained constant according to conditional expression (1), the position at which the chief ray (FIG. 11A) passes through the phase modulation surface 113b varies depending on the aperture diameter ϕ of the aperture stop 110a.

Therefore, the value of conditional expression (1) is preferably set within the range thereof. In this manner, the spot images can be prevented from being deformed and the image reconstruction can be reliably performed.

In one embodiment, the aperture stop 110a and the phase modulation surface 113b of the optical wavefront modulation element 113 (phase modulation element) are positioned next to each other and the telecentricity of the aperture stop 110a (aperture stop section) is maintained, so that the outermost chief ray does not intersect the Fno ray (FIG. 11C) in a space between the phase modulation surface 113b of the optical wavefront modulation element 113 (phase modulation element group) and the aperture stop 110a.

According to an embodiment, since the aperture stop 110a has telecentricity, variations in the positions at which the light rays pass through the phase modulation surface 113b can be reduced.

Even when the distance D between the aperture stop 110a and the phase modulation surface 113b is increased, no problem may occur as long as the system is telecentric (angular difference between the axial and marginal chief rays is substantially zero).

Figure 13A:
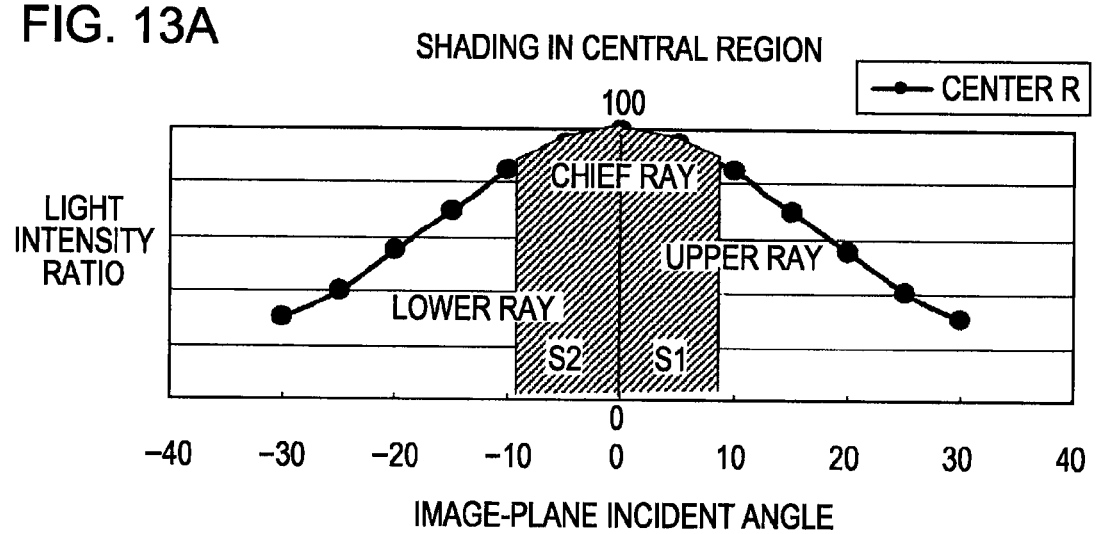
FIGS. 13A and 13B are exemplary diagrams illustrating the characteristics obtained when the image pickup device has shading in peripheral and central regions.
Figure 13B:
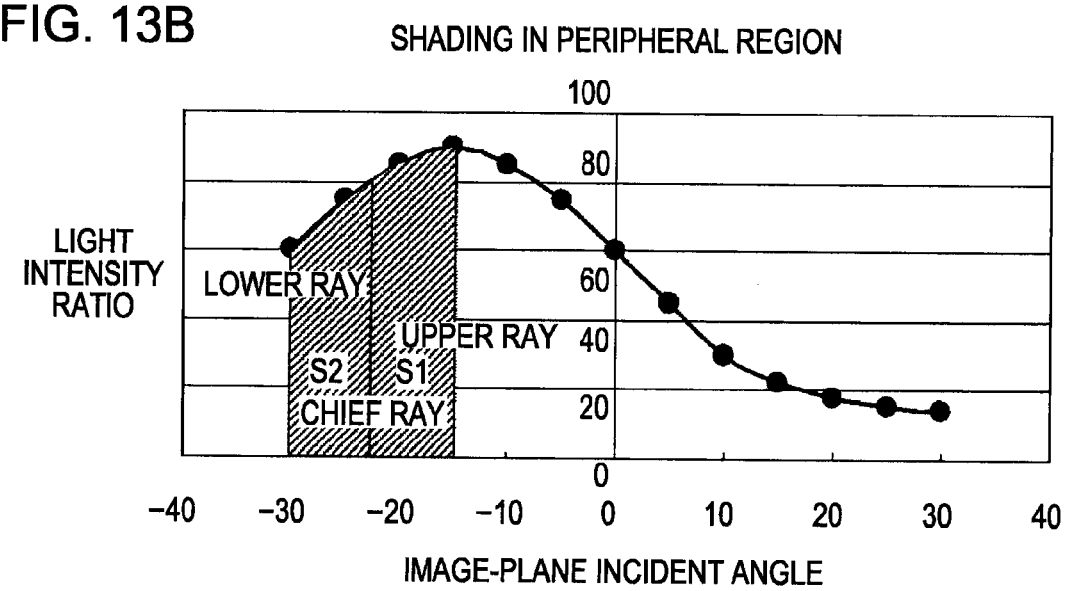

FIGS. 13A and 13B are exemplary diagrams showing shading curves of the image pickup device 120 which are graphical characteristics in which the vertical axis shows the sensitivity of the image pickup device and the horizontal axis shows the incident angle of the light ray. FIGS. 13A and 13B illustrate the characteristics obtained when, for example, the image pickup device 120 has shading in peripheral and central regions.

As shown in FIGS. 13A and 13B, the sensitivities for the upper ray and the lower ray of the Fno ray (FIG. 11C) are not influenced when the shading is in the central region.

In contrast, when the shading is in the peripheral region, the sensitivity for the upper ray (FIG. 11C) differs from that for the lower ray (FIG. 11C). Therefore, it is necessary to form an optical system 110 that is not substantially affected by the shading of the image pickup device 120.

If the optical system 110 is influenced by the shading of the image pickup device 120, the sensitivity differs for each light-ray incident angle. Therefore, the spot images will be deformed.

FIGS. 13A and 13B show the cases in which the shading occurs at the image pickup device 120. When the shading is in the peripheral region and the chief ray is shifted from the sensitivity peak of the image pickup device, the sensitivities for the upper ray and the lower ray of the Fno ray (FIG. 11C) may be significantly influenced. Therefore, the value of conditional expression (2) shown below is preferably set within the range shown below.

Accordingly, in one embodiment, the optical system 110 is configured such that image-side telecentricity is maintained and conditional expression (2) given below is satisfied:

$$0.5 < S1/S2 < 2.0 \quad (2)$$

where S1 (FIGS. 13A-13B) is an area surrounded by a shading curve showing the relationship between the sensitivity of the image pickup device and the light-ray input angle, the upper ray, and the chief ray, and S2 (FIGS. 13A-13B) is an area surrounded by the shading curve of the image pickup device, the lower ray, and the chief ray.

Here, the shading curve of the image pickup device is a graphical characteristic in which the vertical axis shows the sensitivity of the image pickup device and the horizontal axis shows the incident angle of the light ray.

In one embodiment, the optical system 110 is structured such that the aperture stop 110a and the optical wavefront modulation element 113 (phase modulation element) are located next to each other, so that the telecentricity of the aperture stop 110a (aperture stop section) is maintained based on the conditional expressions (3) and (4) given below:

$$\phi/D < 1 \quad (3)$$

$$\alpha < 45° \quad (4)$$

where $\alpha$ is the incident angle at which the outermost chief ray is incident on the aperture stop 110a, and $\phi$ and D are as described above.

Figure 14A:
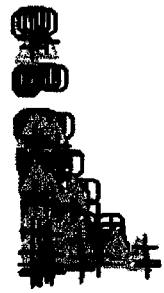
FIGS. 14A to 14C are exemplary diagrams illustrating the influence of the shading areas S1 and S2 on the spot images.
Figure 14B:
Figure 14C:
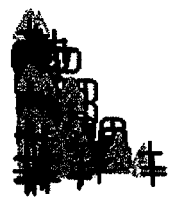

FIGS. 14A to 14C are exemplary diagrams illustrating the influence of the shading areas S1 and S2 on the spot images.

If the conditions given above for S1/S2 values in conditional expression (2) are not satisfied (i.e., $S1/S2 \geq 2$ and/or $0.5 \geq S1/S2$), and the balance between the areas S1 and S2 is reduced, then the shapes of the spot images are influenced such that it may become difficult to reconstruct the image.

Figure 15A:
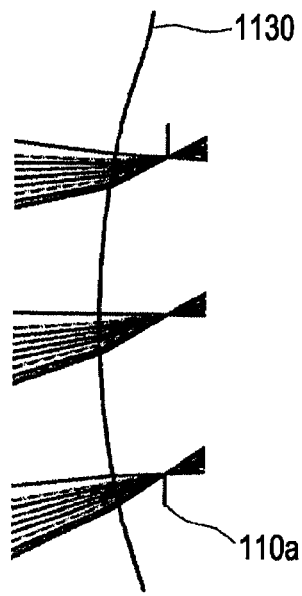
FIGS. 15A and 15B are exemplary diagrams illustrating the influence of telecentricity on the phase modulation element (optical wavefront modulation element).
Figure 15B:
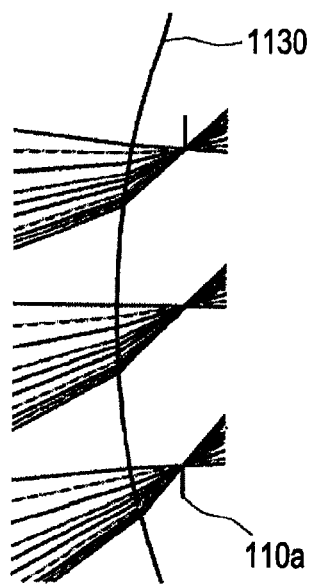

FIGS. 15A and 15B are diagrams illustrating the influence of telecentricity on the optical wavefront modulation element 113 (phase modulation element). As discussed in the context of discussion of FIGS. 11 and 12, when the upper ray and the lower ray vary, the spot images are deformed accordingly. Therefore, when the aperture stop 110a (aperture stop section) is telecentric, the influence of the optical wavefront modulation element 113 (phase modulation element) can be reduced. In FIG. 11B, $\phi/D=1$ and $\alpha=45°$ are the conditions, and the outermost chief ray intersects the Fno ray. Therefore, conditional expressions (3) and (4) are preferably satisfied. Analogously, in FIG. 15A the conditional expressions (3) and (4) are satisfied and the aperture stop 110a is telecentric, whereas in FIG. 15B the conditional expressions (3) and (4) are not satisfied and the aperture stop 110a is not telecentric.

Figure 16:
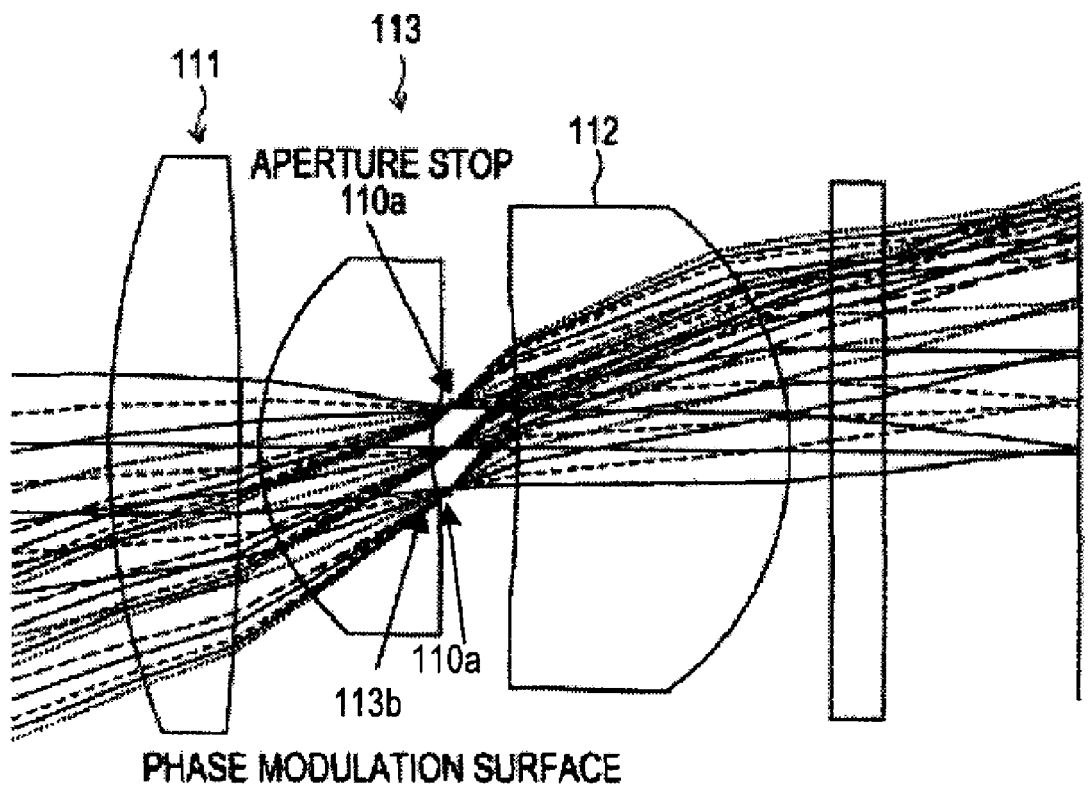
FIG. 16 is a diagram illustrating an exemplary optical system in which the phase modulation surface is formed on an optical lens.
Figure 17:
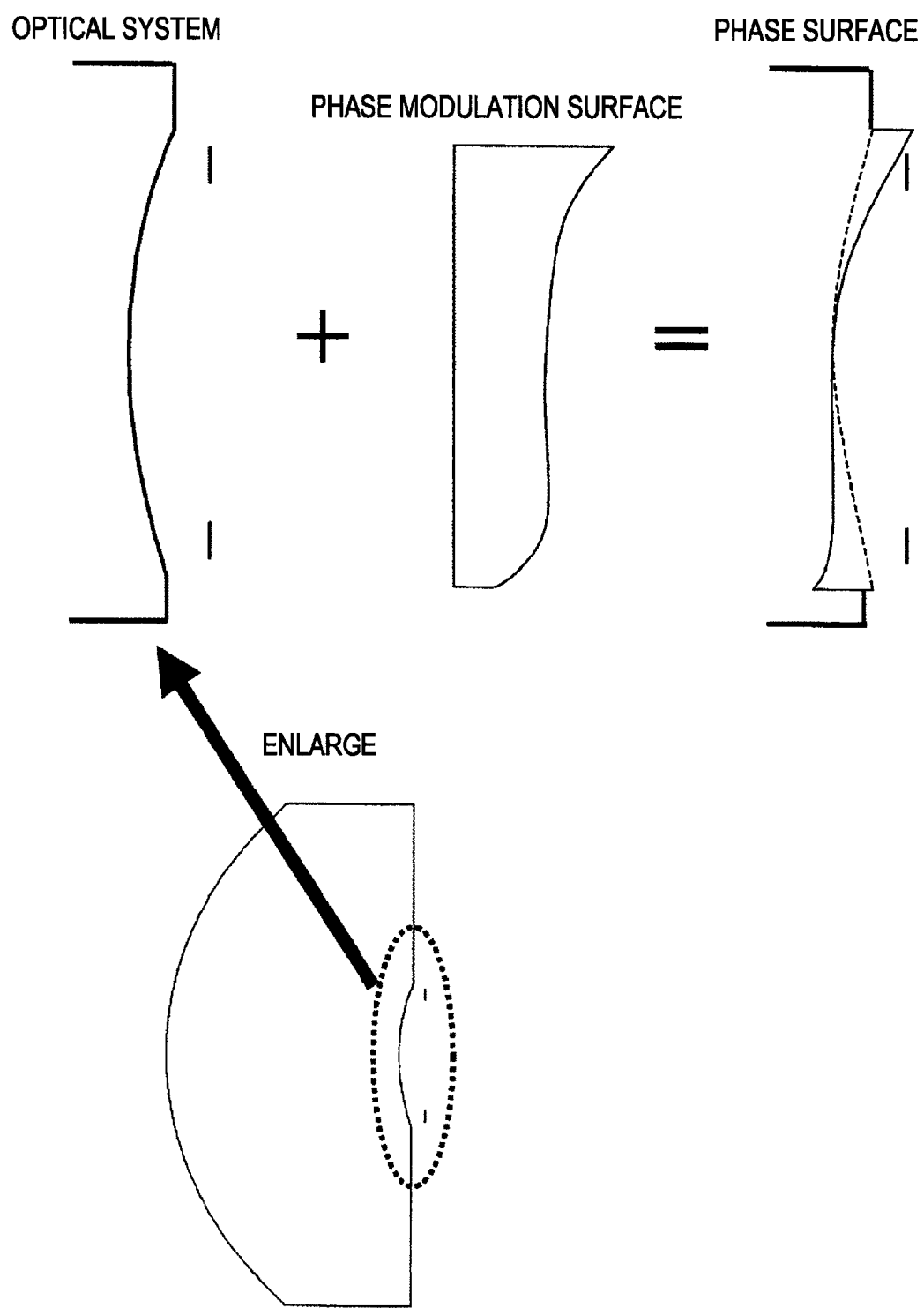
FIG. 17 is a schematic diagram illustrating an exemplary process of forming the phase modulation surface.

The phase modulation surface 113b (optical wavefront modulation surface) of the optical wavefront modulation element 113 (phase modulation element) may also be formed integrally with an optical lens, as shown in FIGS. 16 and 17.

Figure 18:
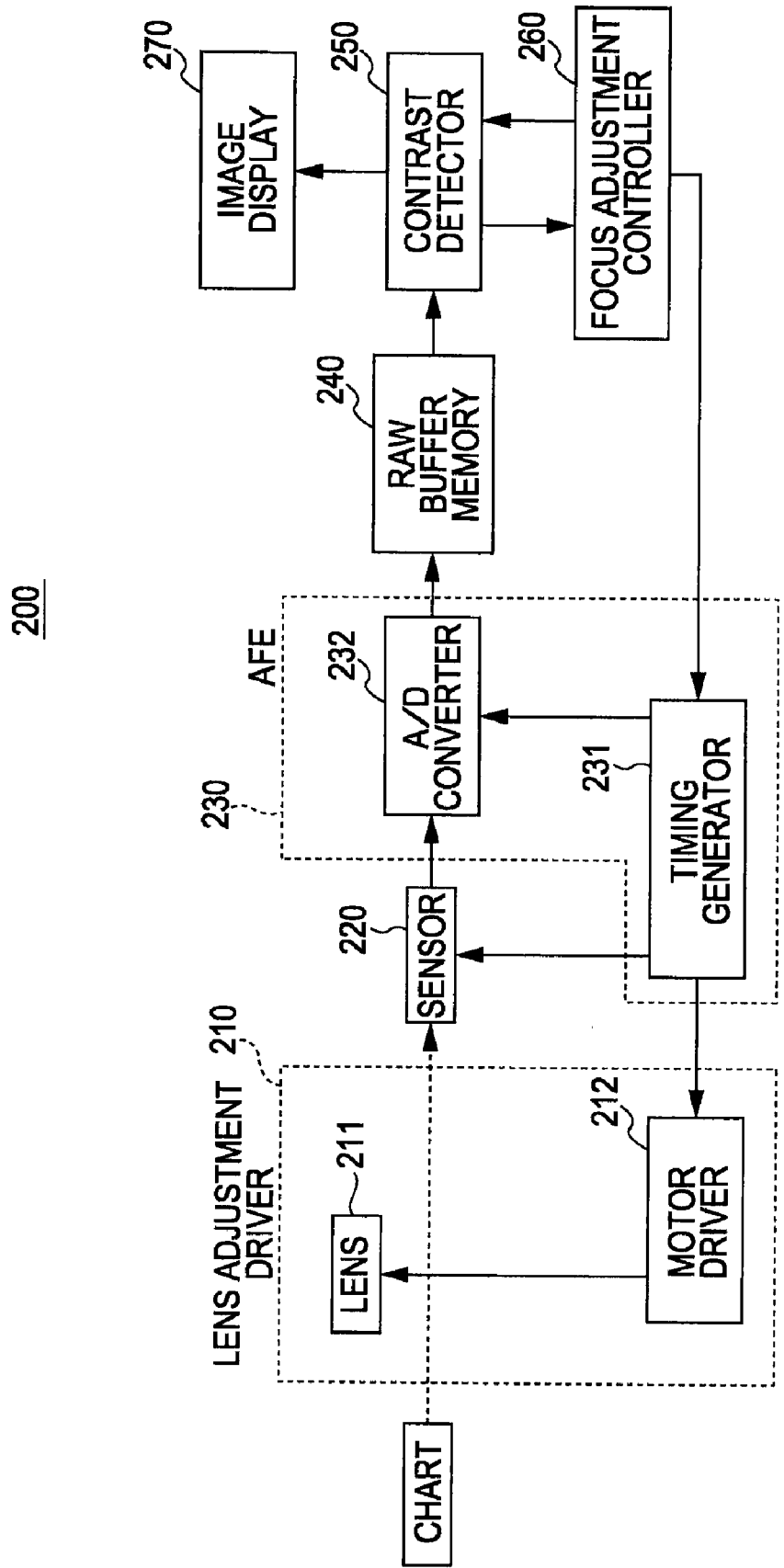
FIG. 18 is an exemplary block diagram illustrating an exemplary system for an adjusting device according to an embodiment of the disclosure.

FIG. 18 is a block diagram illustrating the structure of an adjusting device 200 according to an embodiment. Positions where the optical system 110 and the image pickup device 120 are coupled can be adjusted using an adjusting device (manufacturing device) 200 shown in FIG. 18. The positions may be adjusted by detecting a contrast of the optical system 110 (including the optical wavefront modulation element 113 for modulating the optical transfer function (OTF)), and adjusting the positions such that the detected contrast becomes equal to or greater than a predetermined threshold.

Thus, in the process of assembling the image pickup apparatus 100 according to the present embodiment, the positions where the optical system 110 and the image pickup device 120 are coupled are adjusted such that the detected contrast becomes equal to or greater than the predetermined threshold.

As shown in FIG. 18, the adjusting device 200 may include a lens adjustment driver 210, a sensor 220 that corresponds to the image pickup device 110 shown in FIG. 1, an analog front end (AFE) unit 230, a RAW buffer memory 240, a contrast detector 250, a focus adjustment controller 260 and a image display 270.

The lens adjustment driver 210 may include a lens system (optical system) 211 including an optical wavefront modulation element 113 (see FIGS. 3-5, not shown in FIG. 18). A motor driver 212 drives the lens system 211 along an optical axis thereof, thereby setting the lens position at a desired position.

The AFE unit 230 may include a timing generator 231 and an A/D converter 232. The timing generator 231 can be controlled by the image signal processor 260 so as to generate timing for driving a CCD included in the sensor (image pickup device) 220. The A/D converter 232 is configured to convert an analog signal input from the CCD into a digital signal, and output the thus-obtained digital signal to the RAW buffer memory 240. In addition, the timing generator 231 can also be controlled by the image signal processor 260 so as to supply a drive signal for adjusting the position of the lens 211 relative to the sensor 220 to adjust the focus to the motor driver 212.

The contrast detector 250 is configured to measure the contrast on the basis of data stored in the RAW buffer memory 240 while the optical system 211 is at a certain position. The contrast detector 250 is configured to repeatedly detect the contrast of the object based on the image signal while the optical system 211 is being driven.

The focus adjustment controller 260 is configured to output a control signal for controlling and changing the position of the lens system 211 to the timing generator 231 included in the AFE unit 230 and can cause the contrast detector 250 to measure the contrast while the lens system 211 is at the controlled position. The focus adjustment control can be performed by moving the optical system and/or the image pickup device to a focal position corresponding to a predetermined object distance using the contrast (measurement result) obtained by the contrast detector 250.

The focus adjustment controller 260 can record a position at which the contrast of the object detected by the contrast detector 250 while the optical system 211 is being driven becomes equal to or less than a predetermined threshold. Then, the optical system 211 can be driven in forward and/or backward directions from the recorded position, and can then be driven in a direction in which the contrast is increased from the predetermined threshold. Then, the optical system 211 can be further driven and a position at which the contrast becomes equal to or less than the predetermined threshold can be recorded again. The thus recorded two positions can be used to determine the focal position. For example, a midpoint between the two positions can be determined as the focal position. When the focal position is determined, the focus adjustment controller 260, for example, can display a message indicating that the focal position is determined.

The operation of "driving the optical system" refers to an operation of moving a lens along an optical axis, for example, for a lens in an optical system. For a liquid lens in an optical system, the operation of "driving the optical system" refers to an operation of applying a voltage to the liquid so that an effect is obtained equivalent to that when the normal lens moves along an optical axis.

A portion at which the contrast is detected includes a region where the intensity is high in a point image distribution obtained by the optical wavefront modulation element 113 (phase modulation element). The region where the intensity is high in the point image distribution obtained by the optical wavefront modulation element 113 (phase modulation element) corresponds to a region where the influence of the optical wavefront modulation element 113 (phase modulation element) is small. The "region where the influence of the optical wavefront modulation element 113 (phase modulation element) is small" is explained below.

Figure 19:
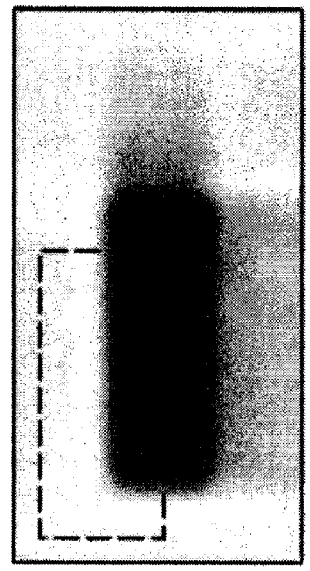
FIG. 19 is an exemplary chart image obtained at a focal position.

FIG. 19 is an exemplary chart image obtained when, for example, the phase of the optical wavefront modulation element 113 (phase modulation element) is expressed as follows:

$$z = \exp\{ix(\alpha(x^3+y^3)+\beta(x^2y+xy^2)+\chi(x^5+y^5)+\delta(x^4y+xy^4)+\epsilon(x^3y^2+x^2y^3))\} \quad (5)$$

$\alpha = -0.00025785$
$\beta = 0.0063043$
$\chi = 0.039457$
$\delta = -0.019513$
$\epsilon = -0.0086456$
where $i$ is $\sqrt{-1}$.

Figure 20:
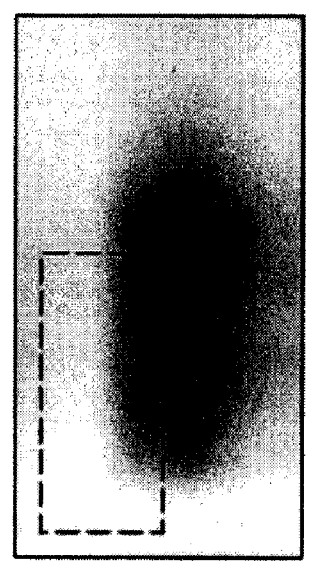
FIG. 20 is an exemplary chart image obtained when the optical system is moved by +0.2 mm from the focal position.
Figure 21:
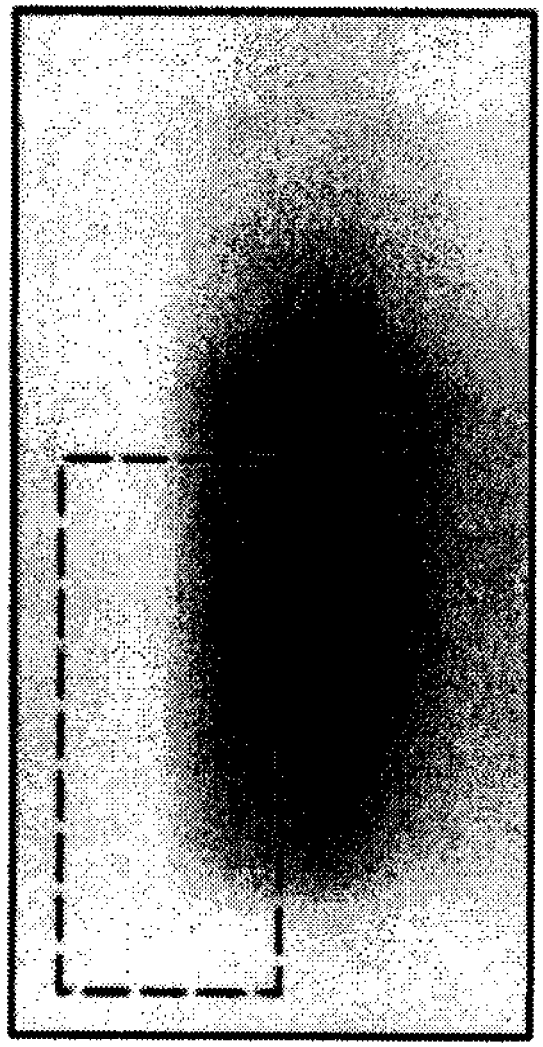
FIG. 21 is an exemplary chart image obtained when the optical system is moved by −0.2 mm from the focal position.
Figure 22:
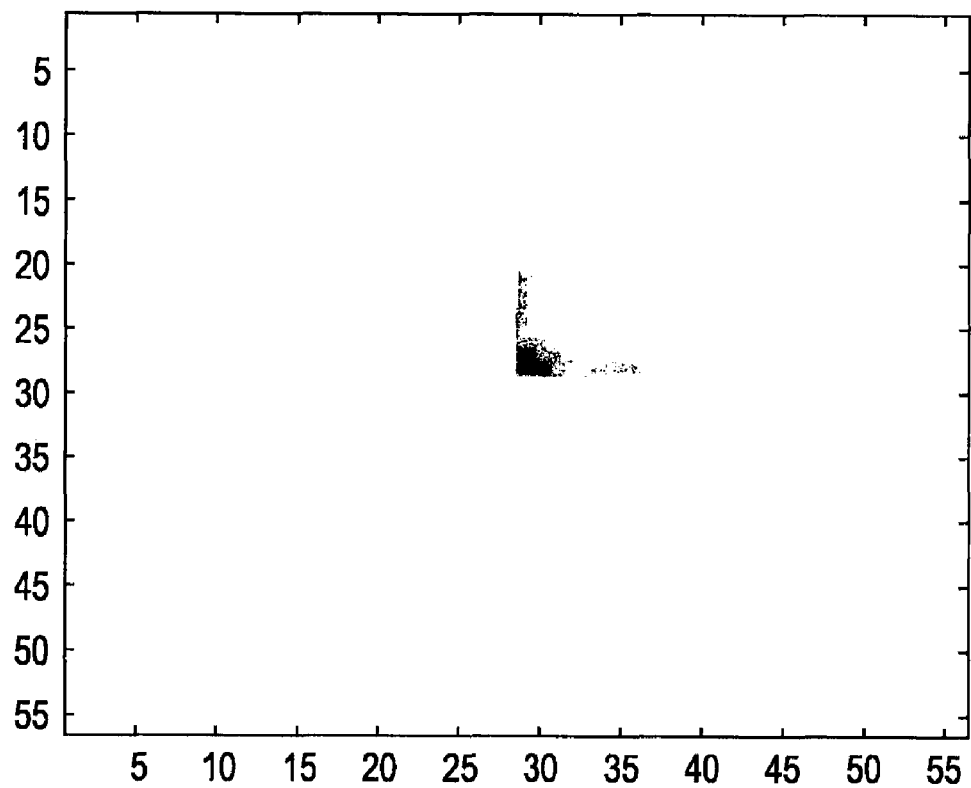
FIG. 22 is an exemplary diagram illustrating a point-image distribution function obtained by a phase surface.

Charts obtained when the optical system 110 is moved by ±0.2 mm are shown in FIGS. 20 and 21. In FIGS. 20 and 21, the "region where the influence of the optical wavefront modulation element 113 (phase modulation element) is small" is surrounded by the dashed lines. When an image of a point light source is obtained using the optical wavefront modulation element 113 (phase modulation element) with the phase expressed in the above equation (5), an asymmetric image can be obtained as shown in FIG. 22. A region other than the region where the image is blurred by the optical wavefront modulation element 113 (phase modulation element) is called the "region where the influence of the optical wavefront modulation element 113 (phase modulation element) is small".

Figure 23:
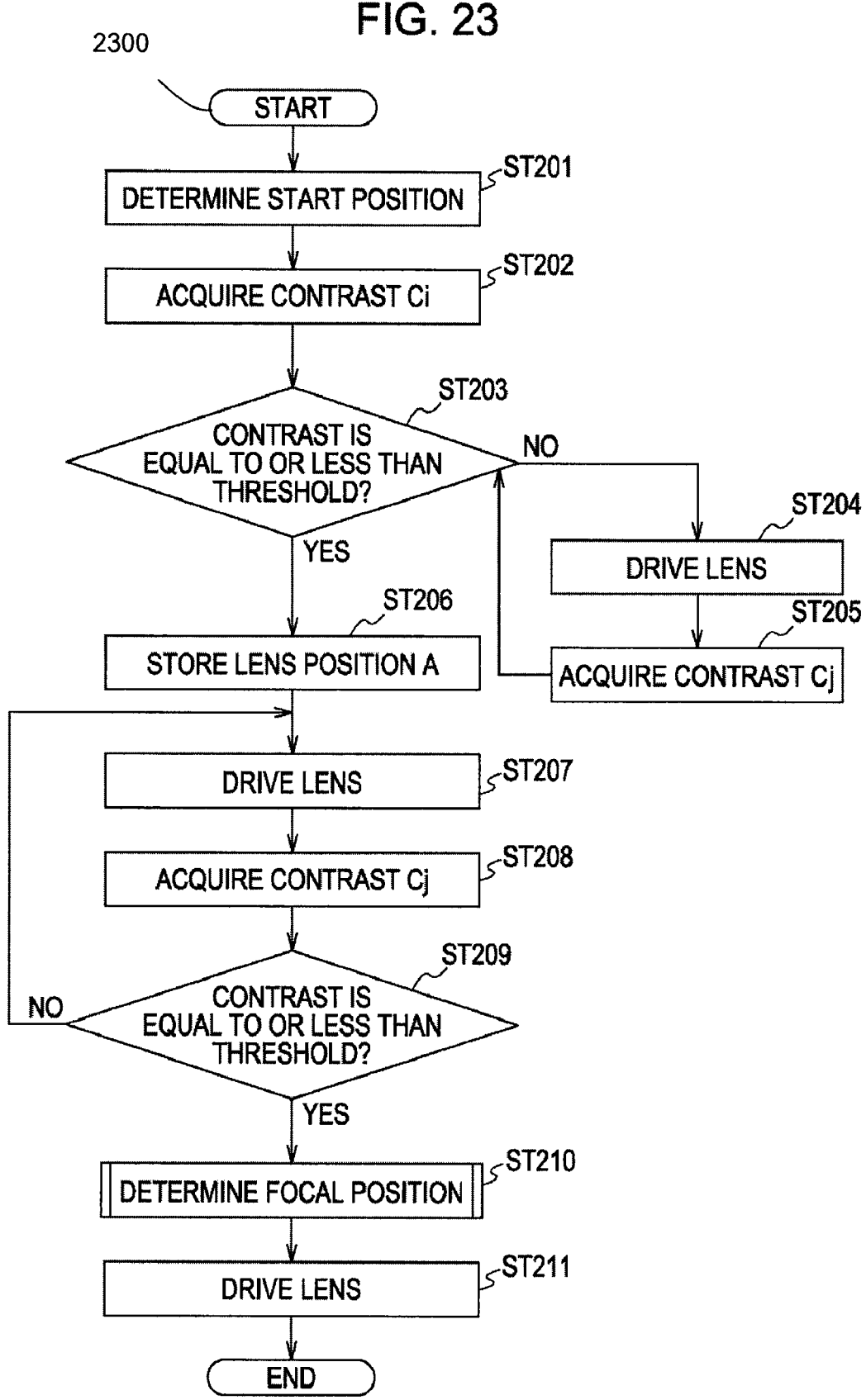
FIG. 23 is an exemplary flowchart of a focal-position determining procedure according to an embodiment of the disclosure.

FIG. 23 illustrates an exemplary process 2300 for determining a focal position according to an embodiment of the disclosure. The various tasks performed in connection with processes 2300 may be performed or controlled by hardware, software, firmware, or any combination thereof. For illustrative purposes, the following description of processes 2300 may refer to elements mentioned in connection with FIGS. 3-22 and 24. In practical embodiments, portions of processes 2300 may be performed by different elements of the described system, e.g., the image pickup device 120 and/or image processing device 140. Process 2300 may include any number of additional or alternative tasks. The tasks shown in FIG. 23 need not be performed in the illustrated order, and process 2300 may be incorporated into a more comprehensive procedures or processes having additional functionality not described in detail herein. Process 2300 may share the same parameters, definition and functionality as explained in the context of discussion of FIGS. 3-22 and 24. Therefore, these definitions and the functionalities are not redundantly explained herein.

Figure 24:
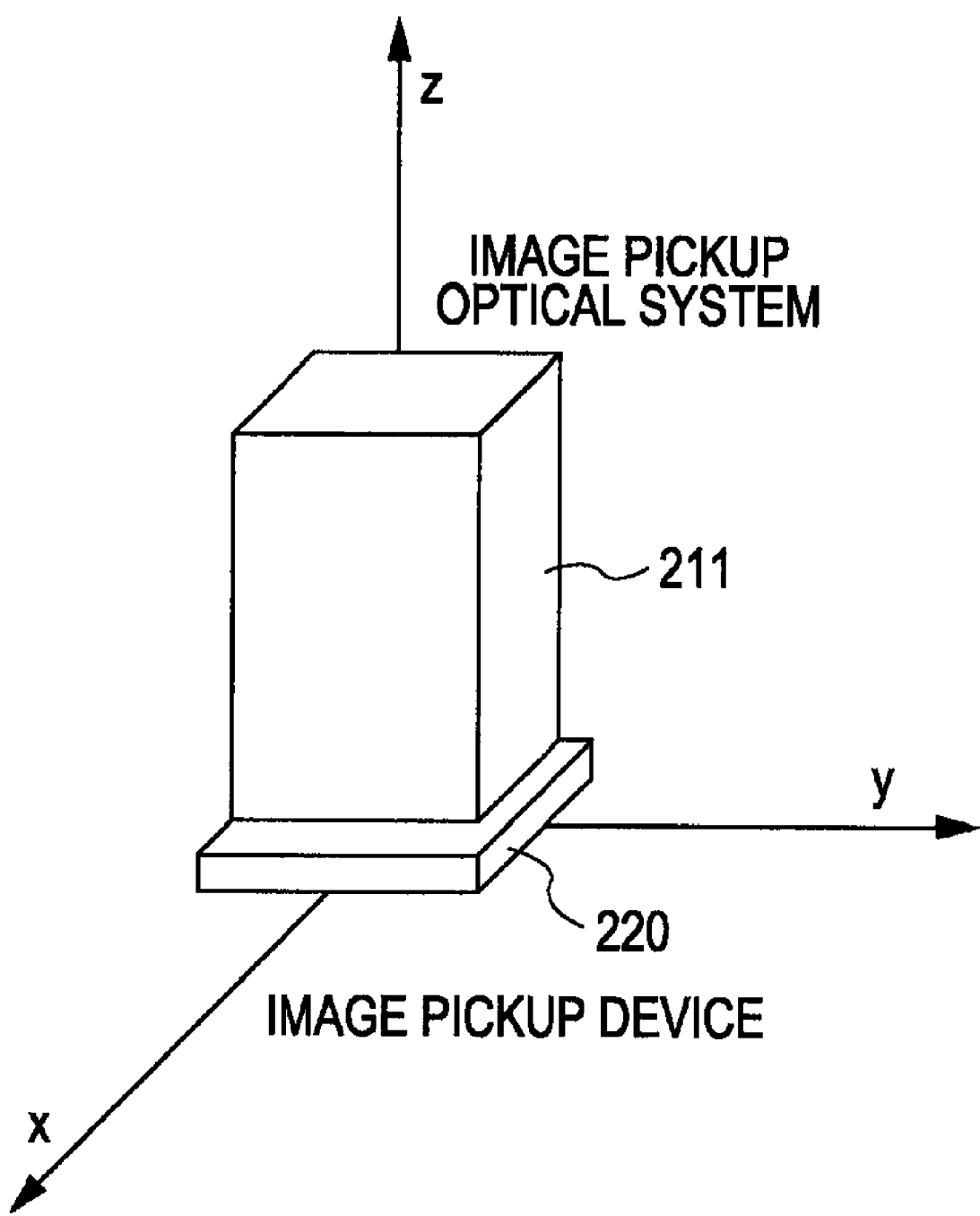
FIG. 24 is an exemplary diagram for illustrating the focal-position determining procedure showing a process of adjusting positions of the optical system and the image pickup apparatus.

First, the sensor (image pickup device) 220 is attached to a lens 211. Then, as shown in FIG. 24, the relative positions of the lens 211 and the sensor 220 are adjusted along x and y axes such that a chart can be taken.

After the position adjustment along the x and y axes, a start position is determined (task ST201) and a contrast is measured at the start position (task ST202).

Then, it is determined whether or not the contrast is equal to or less than the threshold (task ST203). If the contrast is more than the threshold, the lens 211 is driven (task ST204) and the contrast is measured at each point (task ST205).

If the contrast is equal to or less than the threshold, the position A of the lens 211 is stored (task ST206). Then, the lens 211 is driven (task ST207) and the contrast is measured at each point.

Then, it is determined whether or not the contrast is equal to or less than the threshold (task ST209). If the contrast is more than that threshold, the lens 211 is driven (task ST207) and the contrast is measured at each point (task ST208).

If the contrast is equal to or less tan the threshold, the focal position is calculated (task ST210) and the lens 211 is driven (task ST211).

The lens 211 is driven along the z axis (optical axis).

The contrast may be repeatedly detected like a hill-climbing method used in the present embodiment. However, if the detected contrast is equal to or less than the threshold, further driving of the lens may be omitted. In such a case, the processes performed in steps ST206 to ST211 may be omitted. In addition, if the contrast detected first is equal to or less than the threshold, the processes of steps ST204 and ST205 may also be omitted.

Figure 25:
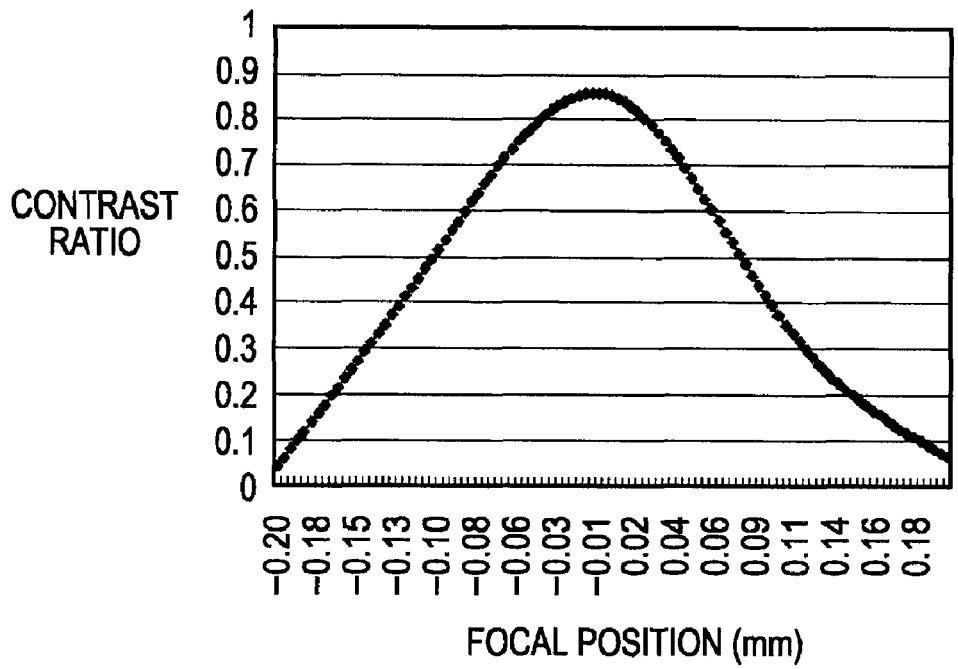
FIG. 25 is an exemplary graph showing contrast variation relative to a focal position in a known optical system.
Figure 26:
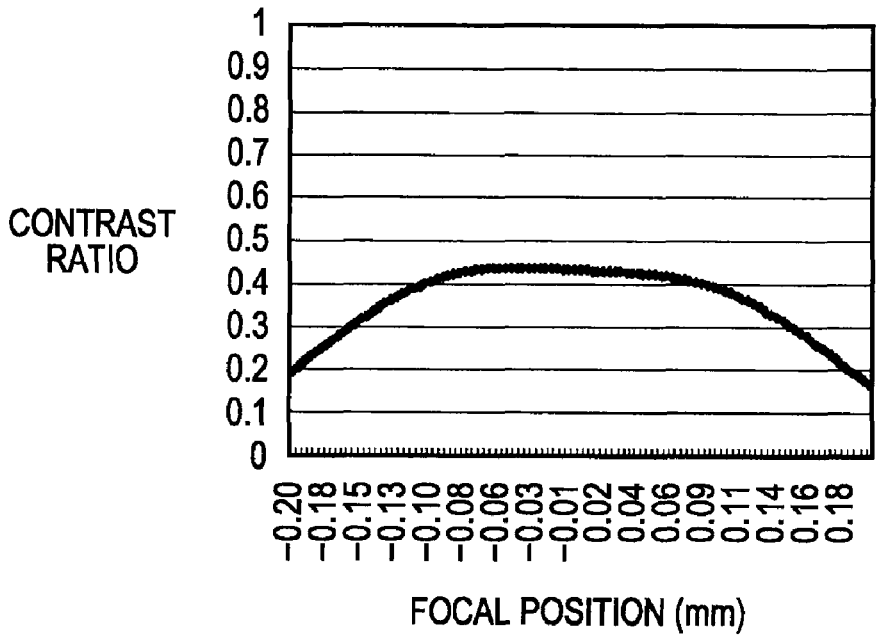
FIG. 26 is an exemplary graph showing contrast variation relative to a focal position in an optical system according to an embodiment of the disclosure.

FIG. 25 is an exemplary graph showing an example of variation in the contrast value when an existing optical system is driven. FIG. 26 is an exemplary graph showing variation in the contrast value when the optical system according to the present embodiment is driven.

In FIGS. 25 and 26, the horizontal axis shows the focal position and the vertical axis shows the contrast ratio.

As shown in FIGS. 25-26, variation in contrast is reduced according to the present embodiment (FIG. 26), as compared to a typical optical system (FIG. 25). Accordingly, the focused state can be easily obtained and shooting at the predetermined object distance can be performed.

Figure 27:
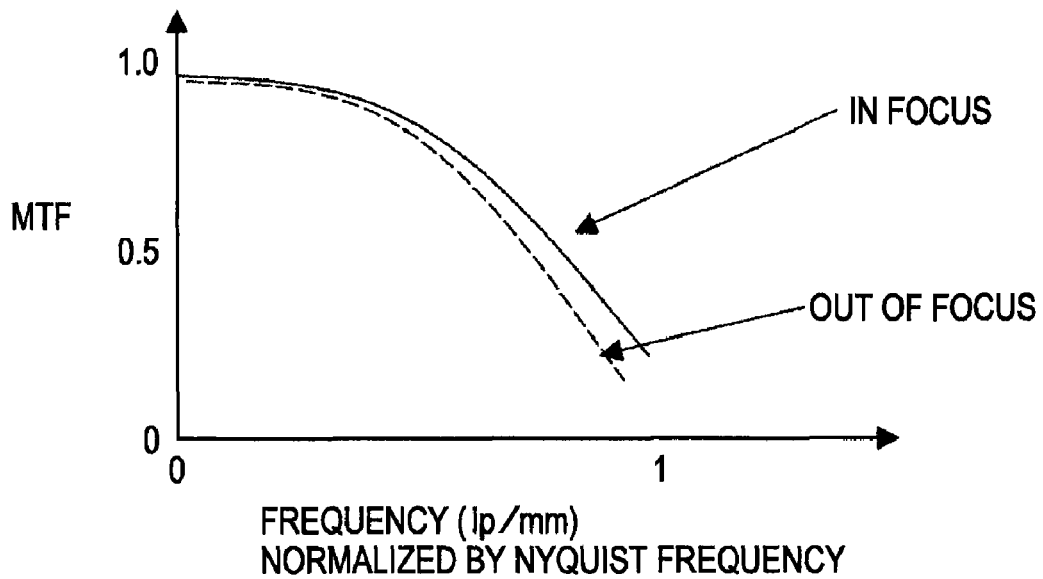
FIG. 27 is an exemplary diagram illustrating the MTF response in a typical optical system.
Figure 28:
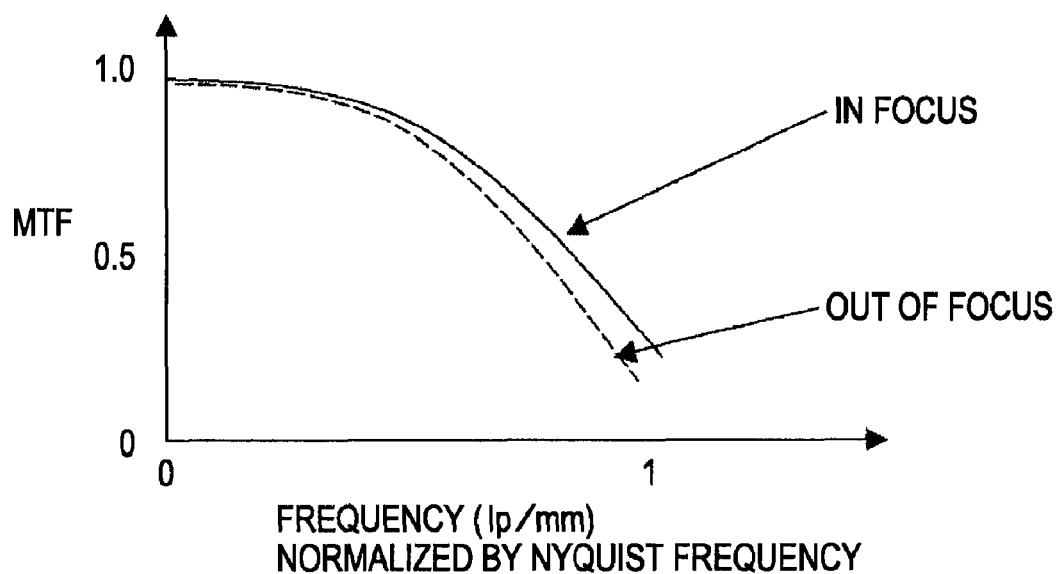
FIG. 28 is an exemplary diagram illustrating the MTF response in the optical system including an optical wavefront modulation element according to an embodiment of the disclosure.

FIG. 27 is an exemplary diagram illustrating the MTF response in a typical optical system. FIG. 28 is an exemplary diagram illustrating the MTF response in the optical system including an optical wavefront modulation element 113.

As shown in FIG. 28, the effect of the optical wavefront modulation element 113 (phase modulation element), that is, phase variation, is reduced and a response similar to that of a typical optical system can be obtained. Therefore, as described above, the focal position can be adjusted by adjusting the attachment positions so as to increase the response. When such an adjustment is performed, a larger depth of field can be obtained compared to the case in which the adjustment is not performed.

When the optical axis of the optical system including the optical wavefront modulation element 113 according to an embodiment is defined as z axis and two axes that are perpendicular to the z axis and to each other are defined as x and y axes, the shape of a wavefront aberration can be expressed as follows:

$$Z = \alpha'(x^3 + y^3) \quad (6)$$

where $|x| \leq 1$ and $|y| \leq 1$ are satisfied and Z indicates the wavefront aberration.

Figure 29:
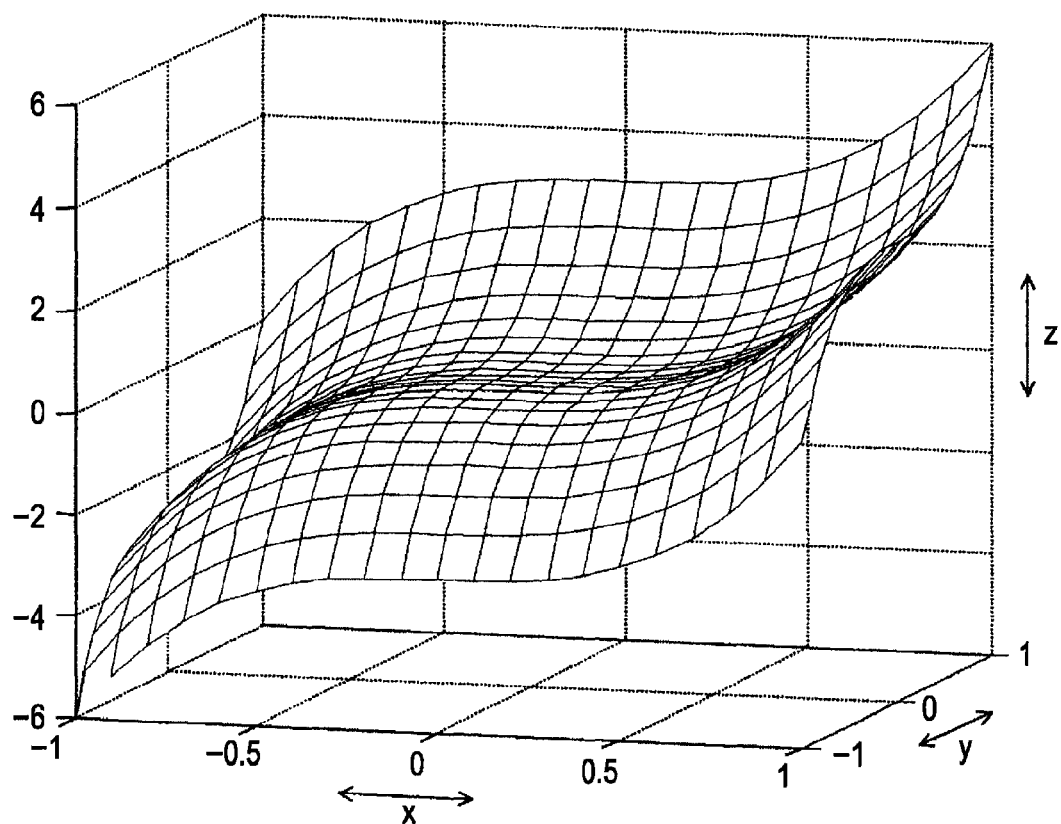
FIG. 29 is an exemplary graph showing the shape of a wavefront aberration that can be expressed by a certain equation when an optical axis of the optical system including the optical wavefront modulation element is z axis and two axes that are perpendicular to the z axis and to each other are x and y axes.

FIG. 29 is an exemplary graph showing a phase of an optical wavefront modulation element 113 according to an embodiment of the disclosure. The optical axis of the optical system is defined as a z axis (i.e., where z is the phase) and two axes that are perpendicular to the z axis and to each other are defined as x and y axes. The phase (Z) can be expressed as follows:

$$z = \exp\left\{i \times \left(\sum_{j=1} C_j x^m y^n\right)\right\} \quad (7)$$

where i is $\sqrt{-1}$, C is a coefficient values, m and n are integers, and $$j = \frac{[(m+n)^2 + m + 3n]}{2},$$

and $|x| \leq 1$, and $|y| \leq 1$ are satisfied.

Figure 30:
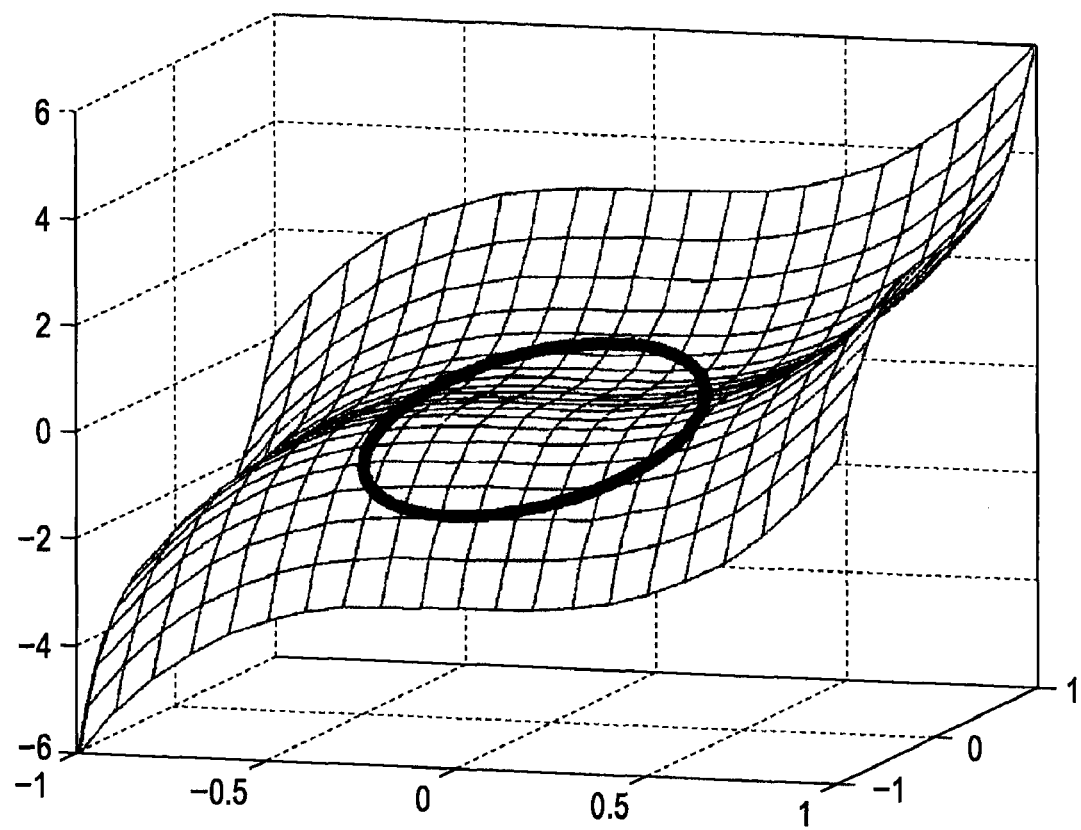
FIG. 30 is an exemplary graph showing the shape of the wavefront aberration in which the area where the wavefront aberration is 0.5 or less is circled by a bold line according to an embodiment of the disclosure.

FIG. 30 shows an exemplary shape of a wavefront aberration and the area where the wavefront aberration is 0.5λ or less is circled by the bold line. In an area where the wavefront aberration Z is 0.5λ or less, the phase variation is small and an OTF similar to that of a typical optical system can be obtained. Therefore, the attachment positions are adjusted by stopping down the aperture until the wavefront aberration is reduced to about 0.5λ. Where λ is a wavelength in the visible light region or infrared region.

As described above, the image processing device 140 receives the first image FIM from the image pickup device 120 and performs a predetermined correction process for lifting the MTF of the first image with respect to the spatial frequency. Accordingly, a final high-definition image FNLIM can be generated.

Figure 31:
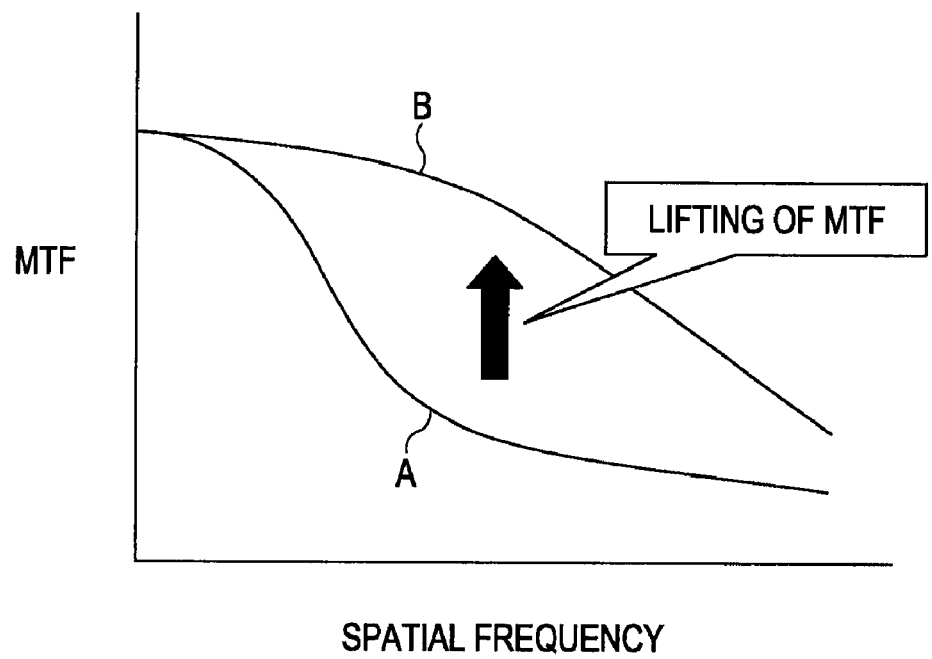
FIG. 31 is an exemplary diagram for explaining an MTF correction process performed by an image processing device according to an embodiment of the disclosure.

FIG. 31 is an exemplary diagram illustrating an MTF correction process performed by image processing device 140 according to an embodiment of the disclosure. In the MTF correction process performed by the image processing device 140, the MTF of the first image, which is low as shown by the curve A in FIG. 31, is changed to an MTF closer to, or the same as, that shown by the curve B in FIG. 31 by performing post-processing. The post-processing, may include, without limitation, including edge emphasis, chroma emphasis and the like using the spatial frequency as a parameter. The characteristic shown by the curve B in FIG. 31 is obtained when, for example, the wavefront shape is not changed without using the optical wavefront modulation element 113 as in the present embodiment. In the present embodiment, all of the corrections are performed using the spatial frequency as a parameter.

According to an embodiment, in order to obtain the final MTF characteristic curve B from the optically obtained MTF characteristic curve A with respect to the special frequency as shown in FIG. 31, the original image (first image) is corrected by performing edge emphasis or the like for each spatial frequency. For example, the MTF characteristic shown in FIG. 31 is processed with an edge emphasis curve with respect to the spatial frequency shown in FIG. 32.

More specifically, in a predetermined spatial frequency range, the degree of edge emphasis is reduced at a low-frequency side and a high-frequency side and is increased in an intermediate frequency region. Accordingly, the desired MTF characteristic curve B can be virtually obtained.

As described above, the image pickup apparatus 100 according to the present embodiment includes the optical system 110 and the image pickup device 120 for obtaining the first image, and also includes the image processing device 140 for forming the final high-definition image from the first image. The optical system 110 is provided with an optical wavefront modulation element 113 or an optical element, such as, without limitation, a glass element and a plastic element, having a surface processed so as to perform wavefront formation, so that the wavefront of light can be changed (modulated). The light with the modulated wavefront forms an image, i.e., the first image, on the imaging plane (light-receiving surface) of the image pickup device 120 including a CCD or a CMOS sensor.

According to an embodiment, the image pickup apparatus 100 is configured to function as an image-forming system that can obtain a high-definition image from the first image through the image processing device 140.

In the present embodiment, the first image obtained by the image pickup device 120 is in light conditions with an extremely large depth of field. Therefore, the MTF of the first image is low, and is corrected by the image processing device 140.

The image-forming process performed by the image pickup apparatus 100 is discussed below from the wave-optical point of view. When a spherical wave emitted from a single point of an object passes through an imaging optical system, the spherical wave is converted into a convergent wave. The aberrations may be generated unless the imaging optical system is an ideal optical system. Therefore, the wavefront shape may be changed into a complex shape instead of a spherical shape. Wavefront optics is the science that connects geometrical optics with wave optics, and is useful in dealing with the phenomenon of wavefront. When the wave-optical MTF at the focal point is considered, information of the wavefront at the exit pupil position in the imaging optical system becomes important. The MTF can be calculated by the Fourier transform of wave-optical intensity distribution at the focal point. The wave-optical intensity distribution can be obtained as a square of wave-optical amplitude distribution, which can be obtained by the Fourier transform of a pupil function at the exit pupil. The pupil function is the wavefront information (wavefront aberration) at the exit pupil position. Therefore, the MTF can be calculated if the wavefront aberration of the optical system 110 can be accurately calculated.

Accordingly, the MTF value at the imaging plane can be arbitrary changed by changing the wavefront information at the exit pupil position by a predetermined process. Also in the present embodiment in which the wavefront shape can be changed using the optical wavefront modulation element 113, desired wavefront formation can be performed by varying the phase (the light path length along the light beam). When the desired wavefront formation is performed, light output from the exit pupil can form an image including portions where light rays are dense and portions where light rays are sparse, as indicated in the geometrical optical spot images shown in FIGS. 9A to 9C. In this state, the MTF value is low in regions where the spatial frequency is low and an acceptable resolution is obtained in regions where the spatial frequency is high. When the MTF value is low, in other words, when the above-mentioned geometrical optical spot images are obtained, aliasing does not occur. Therefore, it is not necessary to use a low-pass filter. Then, flare images, which may cause the reduction in the MTF value, are removed by the image processing device 140 including the DSP or the like. Accordingly, the MTF value can be considerably increased.

Figure 33:
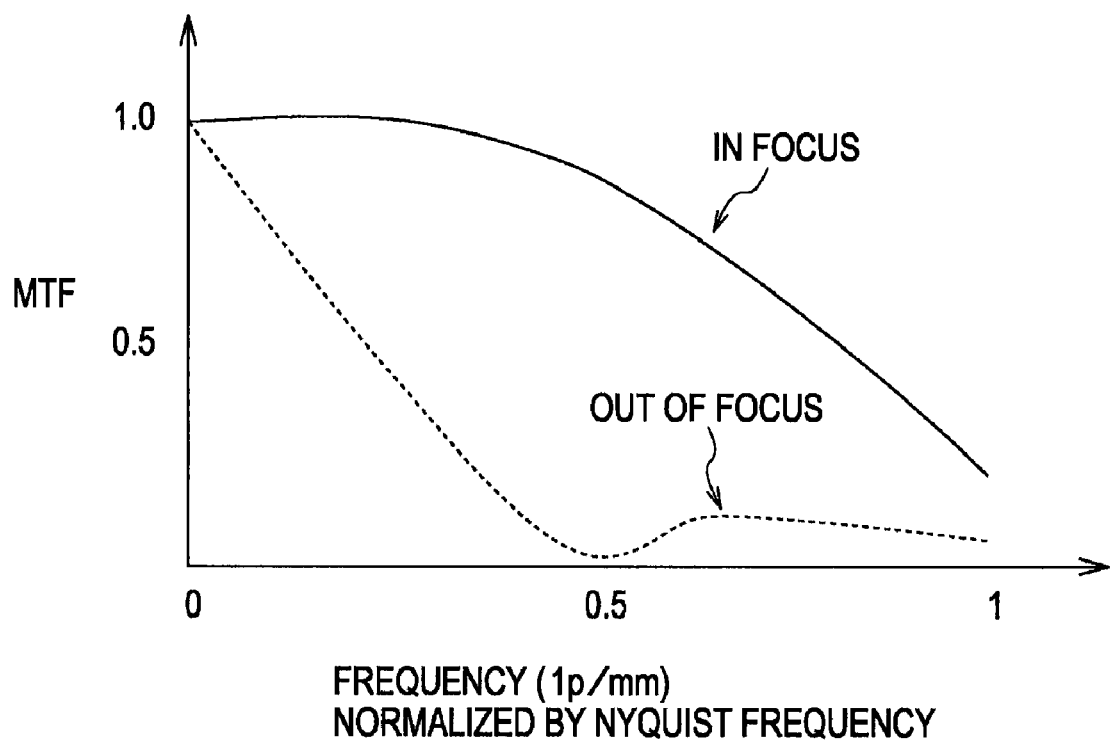
FIG. 33 is an exemplary diagram illustrating the MTF response obtained when an object is in focus and when the object is out of focus in an existing optical system.
Figure 34:
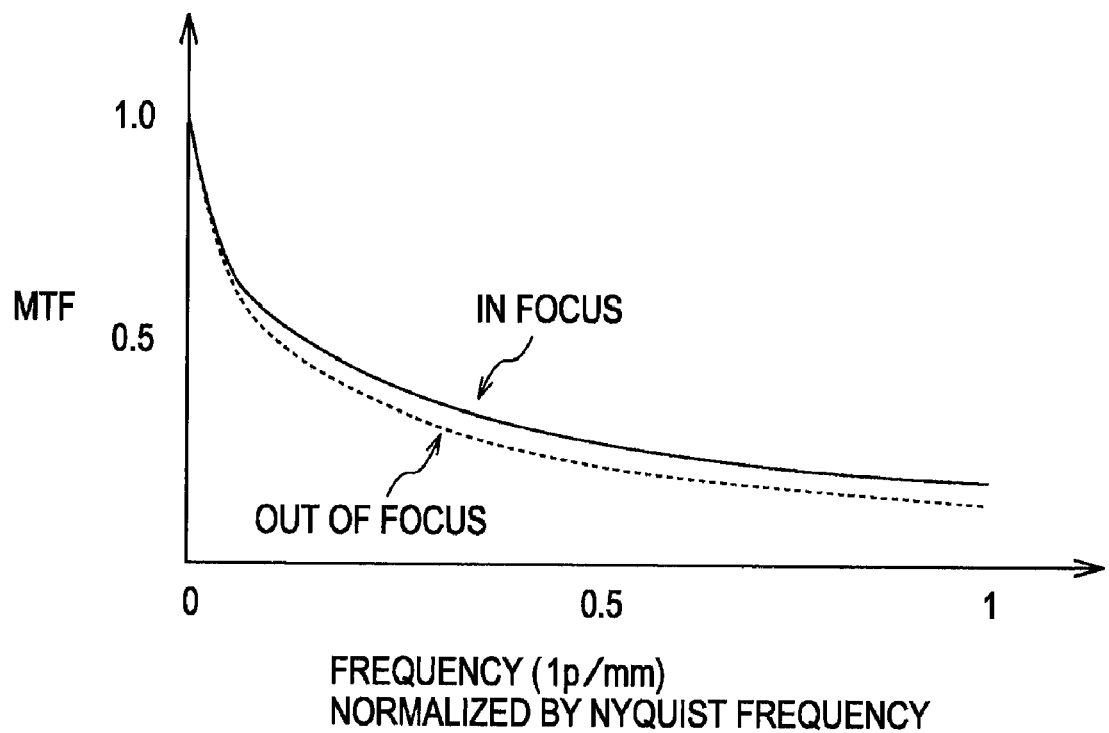
FIG. 34 is an exemplary diagram illustrating the MTF response obtained when an object is in focus and when the object is out of focus in an optical system including the optical wavefront modulation element according to an embodiment of the disclosure.
Figure 35:
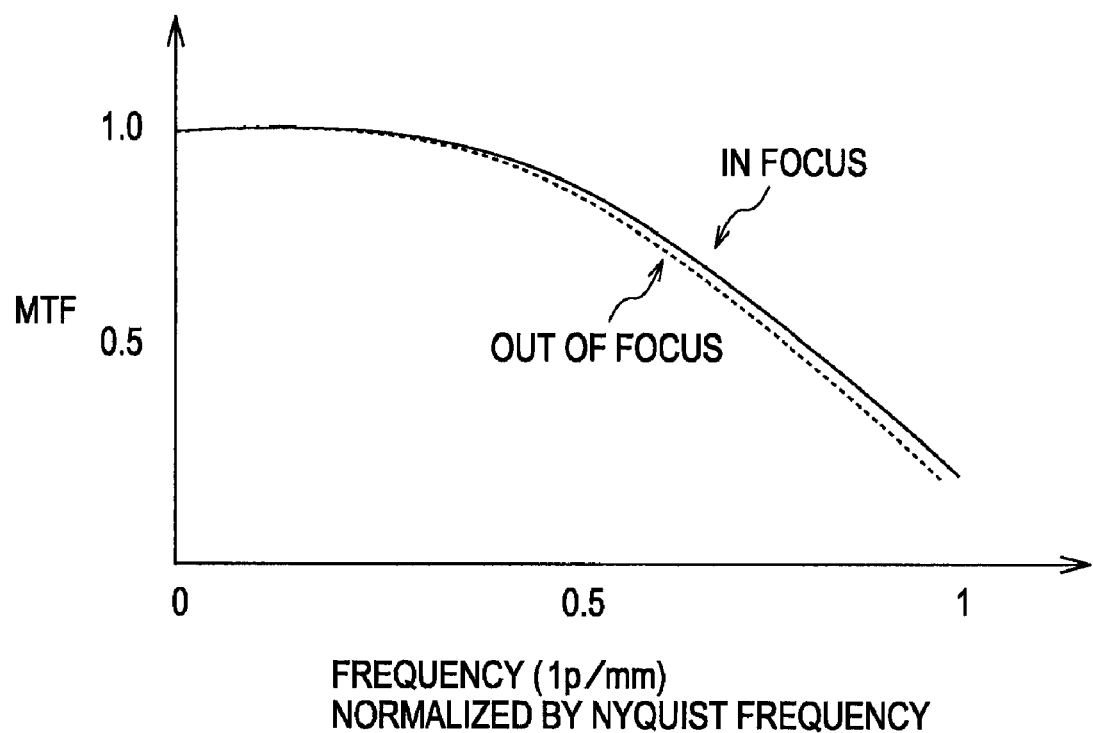
FIG. 35 is an exemplary diagram illustrating the MTF response obtained after data reconstruction in the image pickup apparatus according to an embodiment of the disclosure.

An MTF response of the present embodiment and that of a typical optical system are discussed below. FIG. 33 is an exemplary graph showing the MTF response obtained when an object is in focus and when the object is out of focus in the typical optical system. FIG. 34 is an exemplary graph showing the MTF response obtained when an object is in focus and when the object is out of focus in an optical system including the optical wavefront modulation element 113 according to an embodiment of the disclosure. FIG. 35 is an exemplary graph showing the MTF response obtained after data reconstruction in the image pickup apparatus according to an embodiment of the disclosure.

As shown in FIGS. 33-35, in the optical system including the optical wavefront modulation element 113, variation in the MTF response obtained when the object is out of focus is smaller than that in an optical system free from the optical wavefront modulation element 113. The MTF response in FIGS. 33-35 can be increased by subjecting the image formed by the optical system including the optical wavefront modulation element 113 to a process using a convolution filter.

The OTF (MTF) value for the optical system including a phase plate 113a is preferably 0.1 or more at the Nyquist frequency shown in FIG. 34. The reason for this is described below. In order to obtain the OTF shown in FIG. 34 after reconstruction, the gain is increased by the reconstruction filter. However, the sensor noise is also increased. Therefore, preferably, reconstruction is performed without largely increasing the gain in a high-frequency range around the Nyquist frequency. In a typical optical system, sufficient resolution can be obtained if the MTF value at the Nyquist frequency is 0.1 or more. Therefore, if the MTF value is at least 0.1 before reconstruction, it is not necessary to increase the gain at the Nyquist frequency by the reconstruction filter. If the MTF value is less than 0.1 before reconstruction, the reconstructed image is largely influenced by noise. That is not preferable.

FIGS. 36, 37, and 38 show exemplary kernel data that can be stored in the kernel data storage ROM 143 (FIG. 3) for the convolution process. The kernel data is selected through the convolution controller 144 (FIG. 3) according to various embodiments of the disclosure. The convolution process is calculated on the basis of the PSF that is provided in advance in each of the optical systems. The convolution process acquires exposure information determined when the exposure settings are made by the controller 190 (FIG. 3). The exposure information may include, without limitation, aperture information.

In the embodiment shown in FIG. 36, kernel data A corresponds to an optical magnification of 1.5, kernel data B corresponds to an optical magnification of 5, and kernel data C corresponds to an optical magnification of 10.

In the embodiment shown in FIG. 37, kernel data A corresponds to an F number, which is the aperture information, of 2.8, and kernel data B corresponds to an F number of 4. The F numbers 2.8 and 4 are out of the above-described area where the wavefront aberration is $0.5\lambda$ or less.

Figure 32:
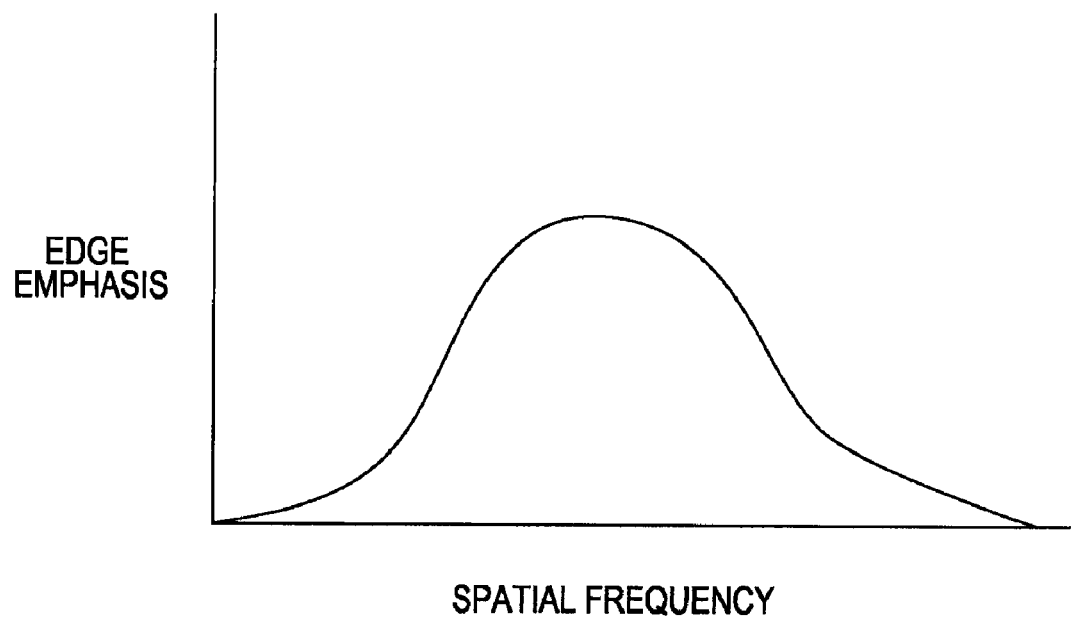
FIG. 32 is an exemplary diagram for specifically explaining the MTF correction process performed by the image processing device according to an embodiment of the disclosure.

In the embodiment shown in FIG. 32, kernel data A corresponds to an object distance of 100 mm, kernel data B corresponds to an object distance of 500 m, and kernel data C corresponds to an object distance of 4 m.

The filtering process is performed in accordance with the aperture information, as in the embodiment shown in FIG. 37, for the following reasons. When the aperture is stopped down (i.e., the aperture diameter is reduced) to shoot an object, the phase plate 113a that functions as the optical wavefront modulation element 113 is covered by the aperture stop 110a. Therefore, the phase is changed and suitable image reconstruction cannot be performed. Therefore, a filtering process corresponding to the aperture information included in the exposure information is performed as in this example, so that suitable image reconstruction can be performed.

Figure 39:
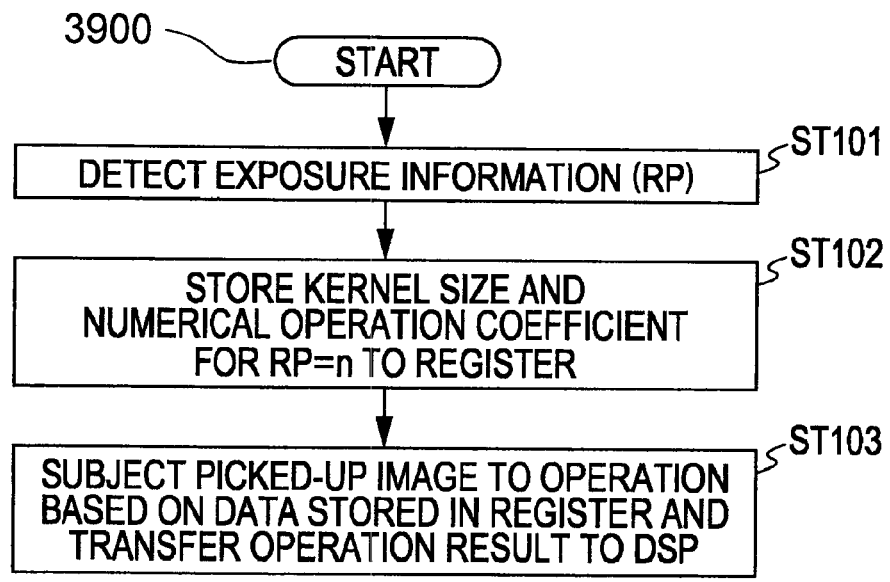
FIG. 39 is an exemplary flowchart of an optical-system setting process that can be performed by an exposure controller according to an embodiment of the disclosure.

FIG. 39 illustrates an exemplary optical system setting process 3900 that can be performed by the controller 190 (exposure controller) according to embodiments of the disclosure. The various tasks performed in connection with process 3900 may be performed or controlled by hardware, software, firmware, or any combination thereof. For illustrative purposes, the following description of process 3900 may refer to elements mentioned above in connection with FIGS. 3-38. In practical embodiments, portions of process 3900 may be performed by different elements of the described system, e.g., the image pickup device 120, image processing device 140, and/or controller 190 (exposure controller). Process 3900 may include any number of additional or alternative tasks. The tasks shown in FIG. 39 need not be performed in the illustrated order, and process 3900 may be incorporated into a more comprehensive procedures or processes having additional functionality not described in detail herein. Process 3900 may share the same parameters, definition and functionality as explained above in the context of discussion of FIGS. 3-38. Therefore, these definitions and the functionalities are not redundantly explained herein.

Process 3900 is an exemplary switching process performed by the controller 190 in accordance with the exposure information (including the aperture information). First, exposure information (RP) is detected, and is supplied to the convolution controller 144 (task ST101). The convolution controller 144 sets the kernel size and the numerical coefficient in a register on the basis of the exposure information RP (task ST102). The image data obtained by the image pickup device 120 and input to the two-dimensional convolution operator 142 through the AFE unit 130 is subjected to the convolution operation based on the data stored in the register. Then, the data obtained and converted by the operation is transmitted to the camera signal processor 150 (task ST103).

FIGS. 40-43 illustrate exemplary schematic block diagrams of image processing systems according to various embodiments of the disclosure. The image processing systems may also include a signal processor and a kernel data storage ROM. The AFE unit, kernel data storage ROM, and the like are omitted from FIGS. 40-43 for simplicity.

Figure 40:
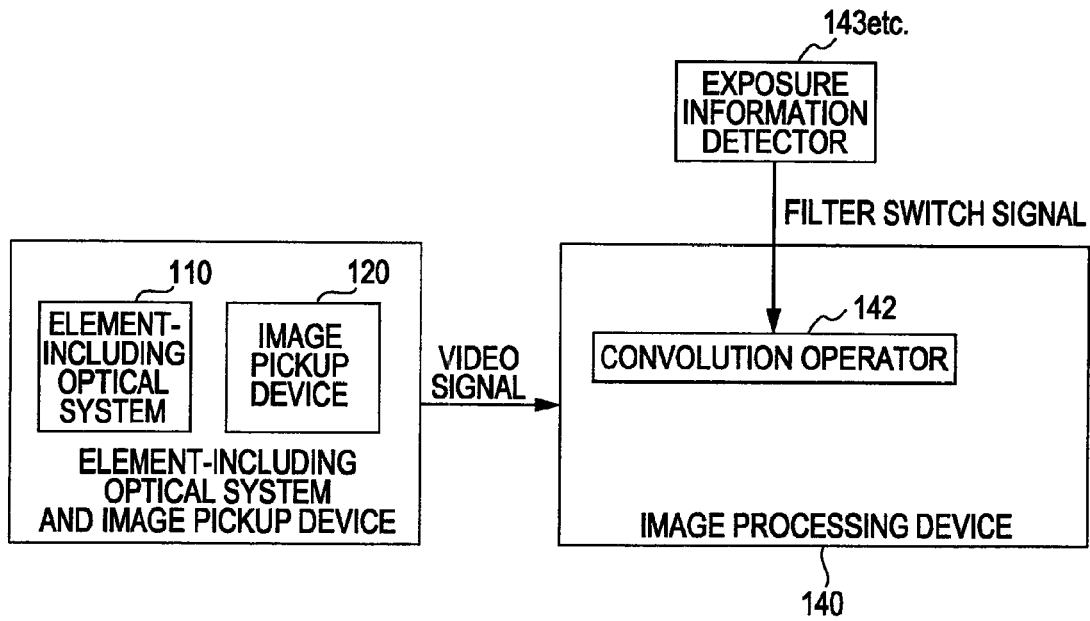
FIG. 40 illustrates a first exemplary schematic block diagram of an image processing system including a signal processor and a kernel data storage ROM.

FIG. 40 illustrates a first exemplary schematic block diagram of an image processing system according to an embodiment of the disclosure. The embodiment shown in FIG. 40 corresponds to a case in which filter kernel data is provided in advance in association with the exposure information.

The image processing device 140 is configured to receive the exposure information that is determined when the exposure settings are made and selects kernel data is selected through the convolution controller 144. The two-dimensional convolution operator 142 is configured to perform the convolution process using the kernel data.

Figure 41:
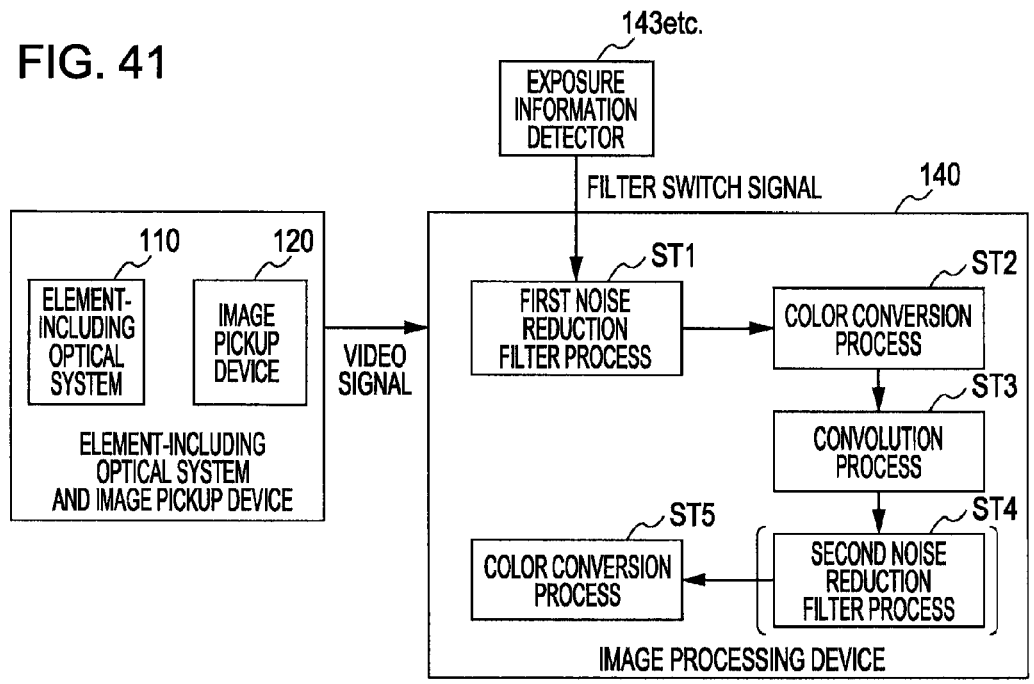
FIG. 41 illustrates a second exemplary schematic block diagram of an image processing system including a signal processor and a kernel data storage ROM.

FIG. 41 illustrates a second exemplary schematic bock diagram of an image processing system according an embodiment of the disclosure. The blocks shown in FIG. 41 may share the same parameters, definition and functionality as FIG. 40. Therefore, these definitions and the functionalities are not redundantly explained herein.

In the embodiment shown in FIG. 41, a noise-reduction filtering process is performed first by the image processing device 140 and a noise-reduction filtering process ST1 is provided in advance as the filter kernel data in association with the exposure information.

The exposure information determined when the exposure settings are made is detected and the kernel data is selected through the convolution controller 144.

After the first noise-reduction filtering process ST1, the two-dimensional convolution operator 142 performs a color conversion process ST2 for converting the color space and then performs the convolution process (OTF reconstruction filtering process) ST3 using the kernel data.

Then, a second noise-reduction filtering process ST4 is performed and the color space is returned to the original state by a color conversion process ST5. The color conversion processes may be, for example, YCbCr conversion. However, other kinds of conversion processes may also be performed. In one embodiment, the second noise-reduction filtering process ST4 may be omitted.

Figure 42:
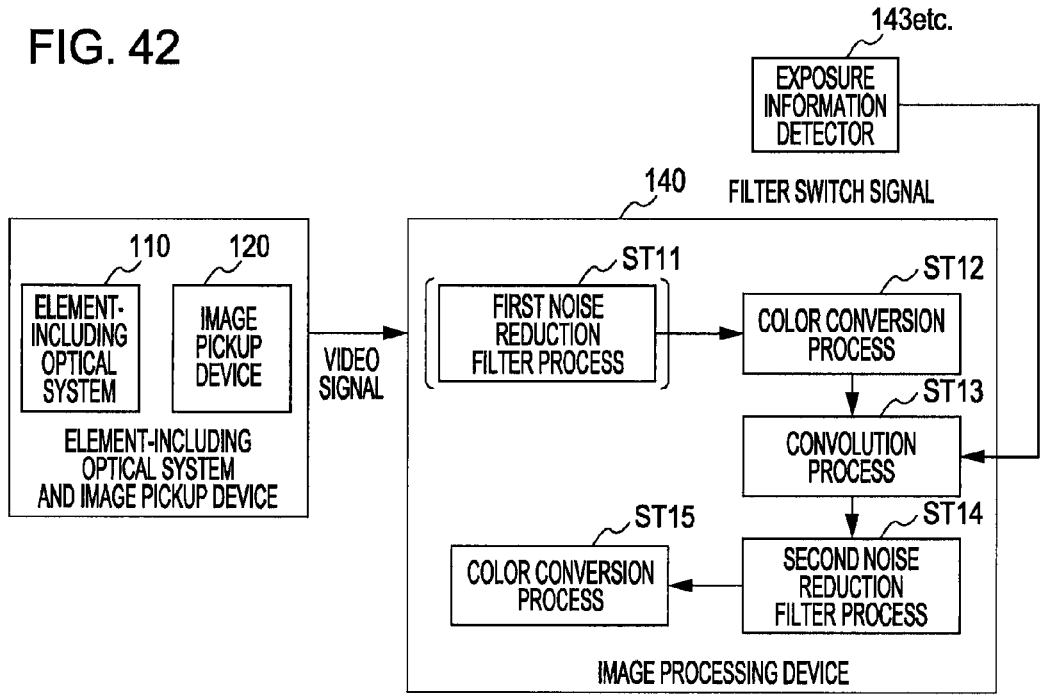
FIG. 42 illustrates a third exemplary schematic block diagram of an image processing system including a signal processor and a kernel data storage ROM.

FIG. 42 illustrates a third exemplary schematic block diagram of an image processing system. The blocks shown in FIG. 42 may share the same parameters, definition and functionality as FIG. 40-41. Therefore, these definitions and the functionalities are not redundantly explained herein.

In the embodiment shown in FIG. 42, an OTF reconstruction filter is provided in advance in association with the exposure information. The exposure information determined when the exposure settings are made is detected and the kernel data is selected through the convolution controller 144. After a first noise-reduction filtering process ST11 and a color conversion process ST12, the two-dimensional convolution operator 142 performs a convolution process ST13 using the OTF reconstruction filter.

Then, a second noise-reduction filtering process ST14 is performed and the color space is returned to the original state by a color conversion process ST15. The color conversion processes may be, for example, YCbCr conversion. However, other kinds of conversion processes may also be performed. In one embodiment, one of the first and second noise-reduction filtering processes ST11 and ST14 may also be omitted.

Figure 43:
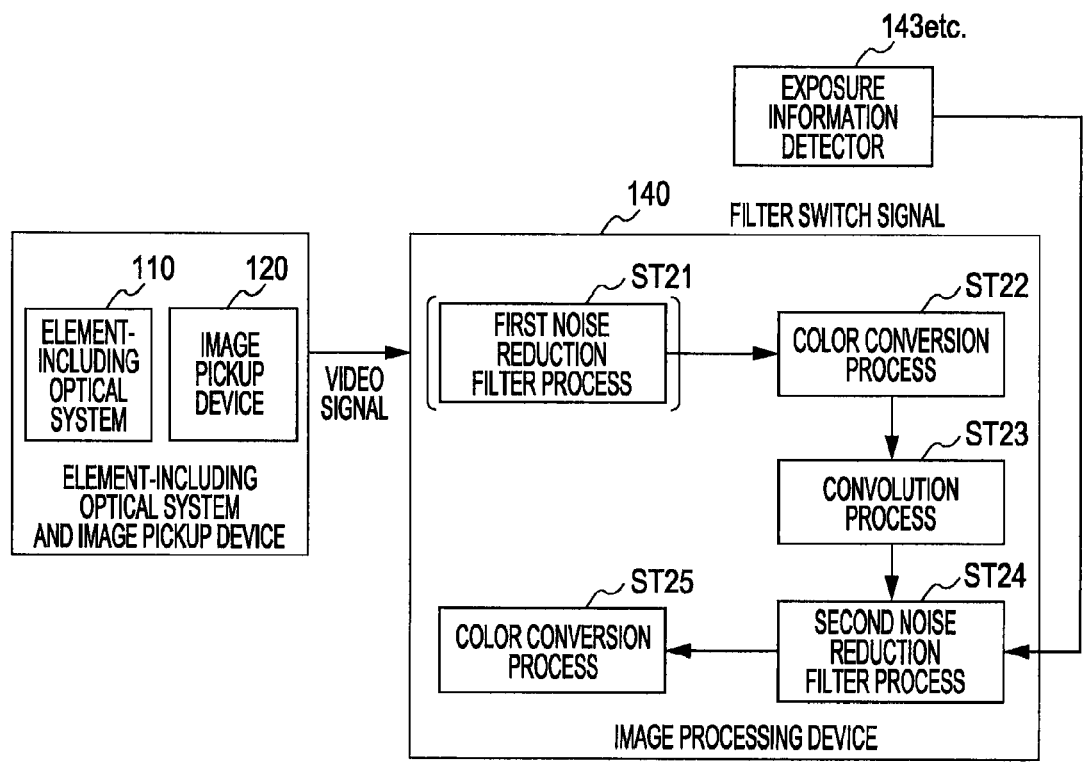
FIG. 43 illustrates a fourth exemplary schematic block diagram of an image processing system including a signal processor and a kernel data storage ROM.

FIG. 43 illustrates a fourth exemplary schematic block diagram of an image processing The blocks shown in FIG. 43 may share the same parameters, definition and functionality as FIG. 40-42. Therefore, these definitions and the functionalities are not redundantly explained herein.

In the embodiment shown in FIG. 43, noise-reduction filtering processes are performed and a noise reduction filter is provided in advance as the filter kernel data in association with the exposure information. The exposure information determined when the exposure settings are made is detected and the kernel data is selected through the convolution controller 144. A second noise-reduction filtering process ST4 may be omitted.

After a first noise-reduction filtering process ST21, the two-dimensional convolution operator 142 performs a color conversion process ST22 for converting the color space and then performs the convolution process ST23 using the kernel data. In one embodiment, the first noise-reduction filtering process ST21 may be omitted.

Then, the second noise-reduction filtering process ST24 is performed in accordance with the exposure information and the color space is returned to the original state by a color conversion process ST25. The color conversion processes may be, for example, YCbCr conversion. However, other kinds of conversion processes may also be performed.

In the above-described examples, the filtering process is performed by the two-dimensional convolution operator 142 in accordance with the exposure information. However, the exposure information may also be used in combination with, for example, object distance information, zoom information, or shooting-mode information so that a more suitable coefficient can be extracted or a suitable operation can be performed.

Figure 44:
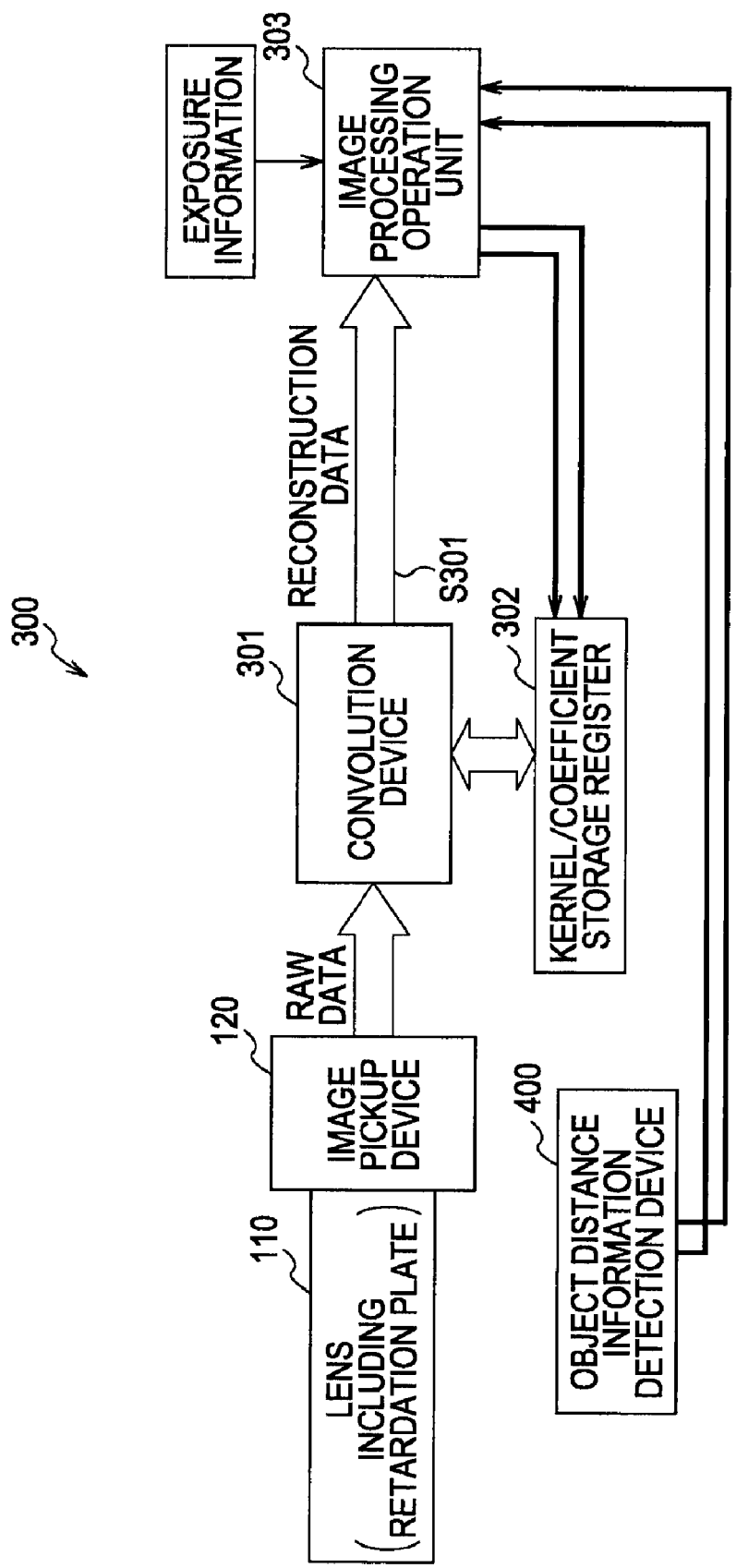
FIG. 44 illustrates an exemplary schematic block diagram of an image processing device in which object distance information and exposure information are used in combination.

FIG. 44 shows an exemplary image processing device 300 in which the object distance information and the exposure information are used in combination. In the image processing device 300 in which an image pickup apparatus 300 generates an image signal with a smaller blur than that of a blurred object-image signal obtained from a image pickup device 120.

As shown in FIG. 44, the image pickup apparatus 300 includes a convolution device 301, a kernel/coefficient storage register 302, and an image processing operation unit 303. The image processing operation unit 303 reads information regarding an approximate distance to the object and exposure information from an object-distance-information detection device 400, and determines a kernel size and a coefficient for use in an operation suitable for the object position. The image processing operation unit 303 stores the kernel size and the coefficient in the kernel/coefficient storage register 302. The convolution device 301 performs the suitable operation using the kernel size and the coefficient so as to reconstruct the image.

In the image pickup apparatus 300 including the phase plate 113*a* (wavefront coding optical element) as the optical wavefront modulation element 113, a suitable image signal without aberration can be obtained by image processing when the focal distance is within a predetermined focal distance range. However, when the focal distance is outside the predetermined focal distance range, there is a limit to the correction that can be achieved by the image processing. Therefore, the image signal may include aberrations for the objects outside the above-described range.

When the image processing is performed such that aberrations do not occur in a predetermined small area, blurred portions can be obtained in an area outside the predetermined small area.

According to the present embodiment, a distance to the main object is detected by the object-distance-information detection device 400 which may include a distance detection sensor. Then, an image correction process is performed in accordance with a detected distance.

The above-described image processing is performed by the convolution operation. To achieve the convolution operation, a single, common coefficient may be stored and a correction coefficient may be stored in association with the focal distance. In such a case, the coefficient can be corrected using the correction coefficient so that a suitable convolution operation can be performed using the corrected coefficient.

In one embodiment, a kernel size and a coefficient for the convolution operation may be directly stored in advance in association with the focal distance, and the convolution operation may be performed using the thus-stored kernel size and coefficient. Alternatively, the coefficient may be stored in advance as a function of focal distance. In this case, the coefficient to be used in the convolution operation may be calculated from this function in accordance with the focal distance.

In one embodiment, in the apparatus shown in FIG. 44, the following structure may be used. That is, the kernel/coefficient storage register 302 functions as conversion-coefficient storing means and stores at least two coefficients corresponding to the aberration caused by at least the phase plate 113a in association with the object distance. The image processing operation unit 303 functions as coefficient-selecting means for selecting one of the coefficients stored in the kernel/coefficient storage register 302. More specifically, the image processing operation unit 303 can select a coefficient that corresponds to the object distance on the basis of information generated by the object-distance-information detection device 400 that functions as object-distance-information generating means.

Then, the convolution device 301, which functions as converting means, can convert the image signal using the coefficient selected by the image processing operation unit 303 which functions as the coefficient-selecting means.

Alternatively, as described above, the image processing operation unit 303 functions as conversion-coefficient calculating means and calculates the coefficient on the basis of the information generated by the object-distance-information detection device 400 which functions as the object-distance-information generating means. The thus-calculated coefficient is stored in the kernel/coefficient storage register 302.

Then, the convolution device 301, which functions as the converting means, can convert the image signal using the coefficient obtained by the image processing operation unit 303 which functions as the conversion-coefficient calculating means and stored in the kernel/coefficient storage register 302.

In one embodiment, the kernel/coefficient storage register 302 functions as correction-value storing means and can store at least one correction value in association with a zoom position or an amount of zoom of the zoom optical system 110. The correction value includes a kernel size of an object aberration image.

The kernel/coefficient storage register 302 can also function as second conversion-coefficient storing means and stores a coefficient corresponding to the aberration caused by the phase plate 113a in advance.

Then, the image processing operation unit 303 functions as correction-value selecting means and selects a correction value from one or more correction values stored in the kernel/coefficient storage register 302 that functions as the correction-value storing means. For example, the image processing operation unit 303 can select a correction value that corresponds to the object distance on the basis of the distance information generated by the object-distance-information detection device 400 that functions as the object-distance-information generating means.

Then, the convolution device 301, which functions as the converting means, can convert the image signal using the coefficient obtained from the kernel/coefficient storage register 302 and the correction value selected by the image processing operation unit 303. The kernel/coefficient storage register 302 functions as the second conversion-coefficient storing means, and the image processing operation unit 303 functions as the correction-value selecting means.

Figure 45:
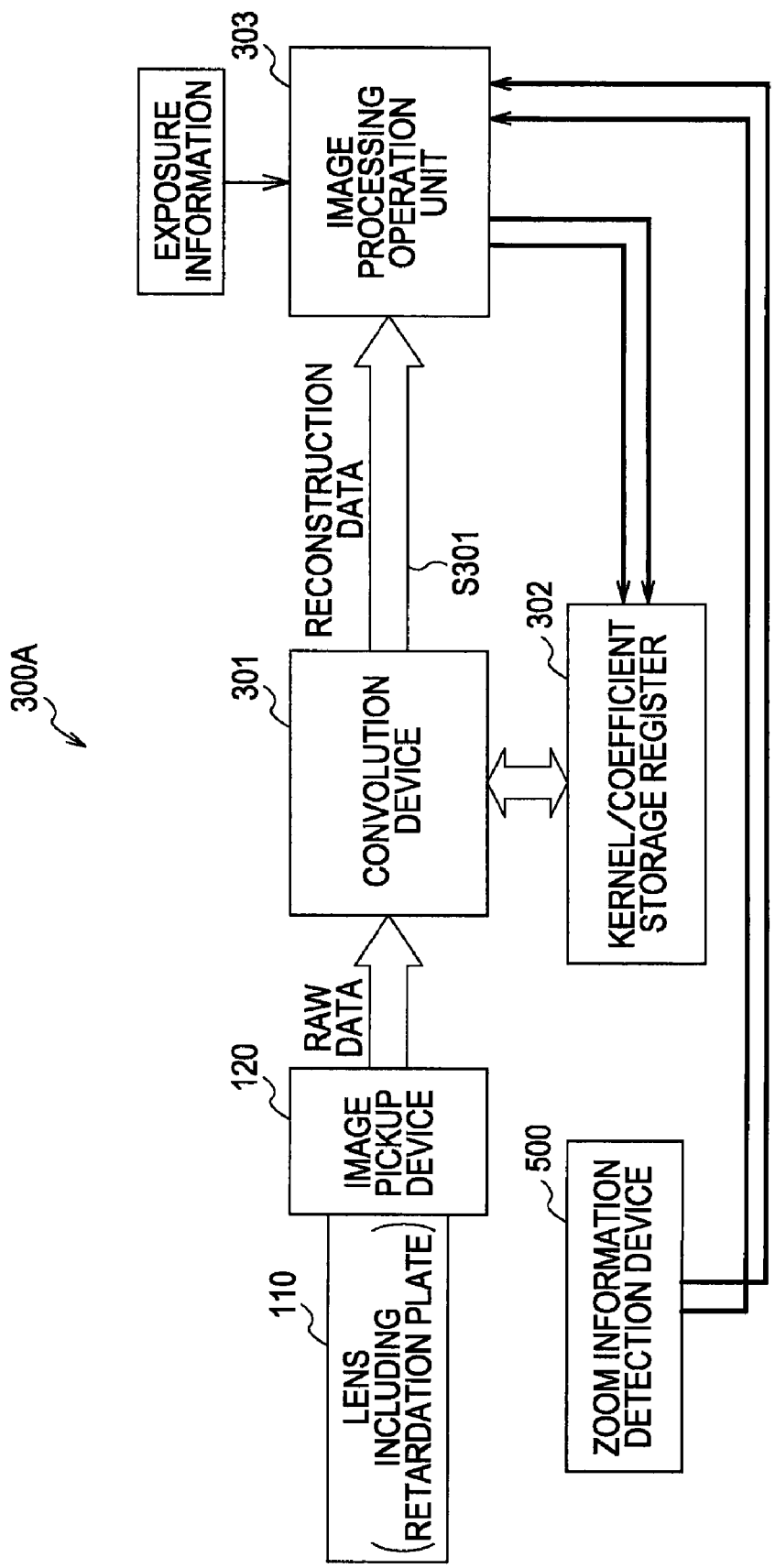
FIG. 45 illustrates an exemplary schematic block diagram of an image processing device in which zoom information and the exposure information are used in combination.

FIG. 45 illustrates an exemplary image processing device in which zoom information and the exposure information are used. In the embodiment shown in FIG. 45, an image pickup apparatus 300A is configured to generate an image signal with a smaller blur than that of a blurred object-image signal obtained from an image pickup device 120. Similar to the image processing device shown in FIG. 44, the image processing device 300A shown in FIG. 45 may include a convolution device 301, a kernel/coefficient storage register 302, and an image processing operation unit 303.

The image processing operation unit 303 can read information regarding the zoom position or the amount of zoom and the exposure information from the zoom information detection device 500. The kernel/coefficient storage register 302 stores kernel size data and operation coefficient data which are used in a suitable operation for exposure information and a zoom position. Accordingly, the convolution device 301 performs a suitable operation so as to reconstruct the image.

As described above, in a case in which the phase plate 113a, which functions as the optical wavefront modulation element 113, is included in the zoom optical system of the image pickup apparatus 100, the generated spot image differs in accordance with the zoom position of the optical system 110. Therefore, in order to obtain a suitable in-focus image by subjecting an out-of-focus image (spot image) obtained by the phase plate 113a to the convolution operation performed by the DSP or the like, the convolution operation that differs in accordance with the zoom position must be performed.

Accordingly, in the present embodiment, the zoom information detection device 500 is provided so that a suitable convolution operation can be performed in accordance with the zoom position and a suitable in-focus image can be obtained irrespective of the zoom position.

In the convolution operation performed by the image processing device 300A, a signal, common operation coefficient for the convolution operation may be stored in the register 302. Alternatively, the following systems may also be used according to various embodiments.

In one embodiment a system may be used in which a correction coefficient is stored in advance in the register 302 in association with the zoom position, and the operation coefficient may be corrected using the correction coefficient, and a suitable convolution operation is performed using a corrected operation coefficient.

According to another embodiment, a system may be used in which a kernel size or an operation coefficient for the convolution operation are stored in advance in the register 302 in association with the zoom position, and the convolution operation is performed using the thus-stored kernel size or the stored convolution operation coefficient.

According to another embodiment, a system may be used in which an operation coefficient is stored in advance in the register 302 as a function of zoom position, and the convolution operation is performed on the basis of a calculated operation coefficient.

In the embodiment shown in FIG. 45, the following structure may be used. The register 302 functions as conversion-coefficient storing means and stores at least two conversion coefficients corresponding to the aberration caused by the phase plate 113*a* in association with the zoom position or the amount of zoom in the zoom optical system 110.

The image processing operation unit 303 functions as coefficient-selecting means for selecting one of the conversion coefficients stored in the register 302. For example, the image processing operation unit 303 selects a conversion coefficient that corresponds to the zoom position or the amount of zoom of the zoom optical system 110 on the basis of information generated by the zoom information detection device 500 that functions as zoom-information generating means.

Then, the convolution device 301, which functions as converting means, converts the image signal using the conversion coefficient selected by the image processing operation unit 303 which functions as the coefficient-selecting means.

Alternatively, as described above, the image processing operation unit 303 functions as conversion-coefficient calculating means and can calculate the conversion coefficient on the basis of the information generated by the zoom information detection device 500 which functions as the zoom-information generating means. The thus-calculated conversion coefficient can be stored in the kernel/coefficient storage register 302.

Then, the convolution device 301, which functions as the converting means, can convert the image signal on the basis of the conversion coefficient obtained by the image processing operation unit 303, which functions as the conversion-coefficient calculating means, and stored in the register 302.

Alternatively, the storage register 302 functions as correction-value storing means and stores at least one correction value in association with the zoom position or the amount of zoom of the optical system 110. The correction value includes a kernel size of an object aberration image.

The register 302 also functions as second conversion-coefficient storing means and stores a conversion coefficient corresponding to the aberration caused by the phase plate 113*a* in advance.

Then, the image processing operation unit 303 functions as correction-value selecting means and selects a correction value, which corresponds to the zoom position or the amount of zoom of the zoom optical system, from one or more correction values stored in the register 302, which functions as the correction-value storing means, on the basis of the zoom information generated by the zoom information detection device 500 that functions as the zoom-information generating means.

The convolution device 301, which functions as the converting means, can convert the image signal using the conversion coefficient obtained from the register 302, which functions as the second conversion-coefficient storing means, and the correction value selected by the image processing operation unit 303, which functions as the correction-value selecting means.

Figure 46:
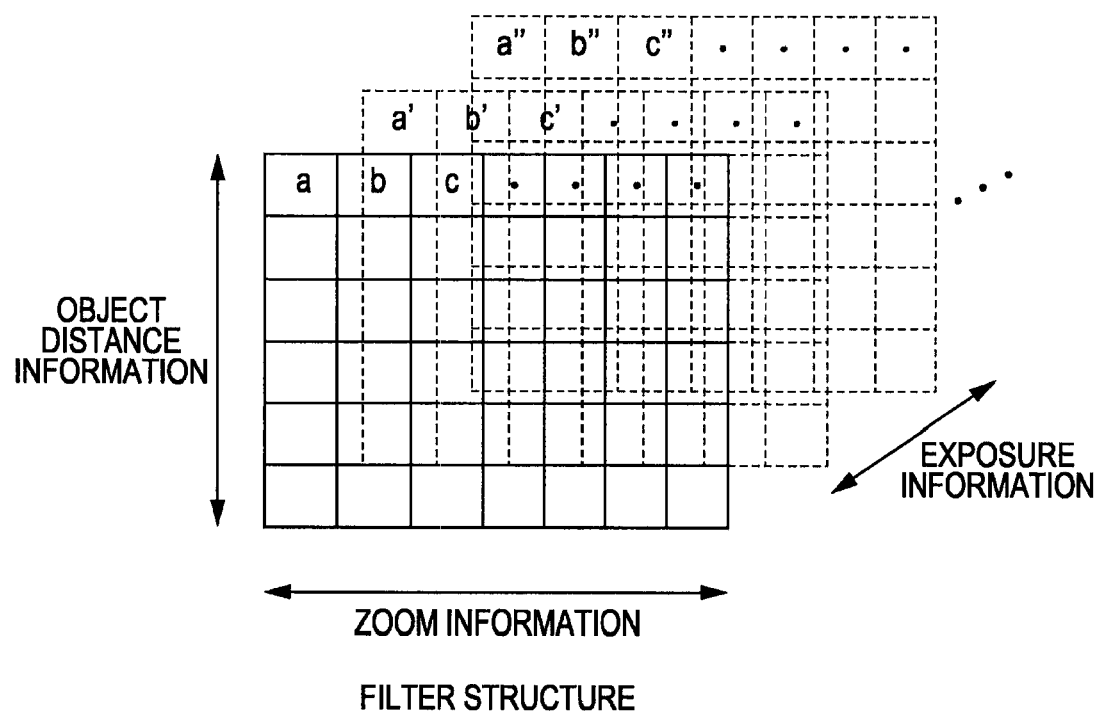
FIG. 46 illustrates an exemplary system filter structure applied when the exposure information, the object distance information, and the zoom information are used.

FIG. 46 shows an exemplary filter structure used when the exposure information, the object distance information, and the zoom information are used. In this example, two-dimensional information structure is formed by the object distance information and the zoom information, and the exposure information elements are arranged along the depth.

The kernel data storage ROM 143 is not limited to storing the kernel sizes and values in association the optical magnification, the F number, and the object distance information, as shown in FIGS. 30, 31, and 32. In addition, the number of kernel data elements to be prepared is not limited to three.

Although the amount of information to be stored is increased as the number of dimensions thereof is increase to three, as shown in FIG. 46, four or more, a more suitable selection can be performed on the basis of various conditions in such a case. The information to be stored includes the exposure information, the object distance information, the zoom information, etc., as described above.

In the image pickup apparatus 100 including the phase plate 113*a* of the optical wavefront modulation element 113 described above, a suitable image signal without aberration can be obtained by image processing when the focal distance is within a predetermined focal distance range. However, when the focal distance is outside the predetermined focal distance range, there may be a limit to the correction that can be performed by the image processing. Therefore, the image signal includes aberrations for only the objects outside the above-described range.

When the image processing is performed such that aberrations do not occur in a predetermined small area, blurred portions can be obtained in an area outside the predetermined small area.

As described above, according to the present embodiment, the image pickup apparatus 100 includes the optical system 110 and the image pickup device 120 for forming a first image. In addition, the image pickup apparatus also includes the image processing device 140 for forming a final high-definition image from the first image.

As explained above, the optical system 110, which includes an optical wavefront modulation element 113 for modulating the optical transfer function (OTF), and an aperture stop 110*a* arranged next to the optical wavefront modulation element 113, satisfies the conditional expression (1) expressed by $\phi \times D < 2$, where $\phi$ is the aperture diameter of the aperture stop 110*a* and D is the distance between the aperture stop 110*a* and the optical wavefront modulation element 113 (phase modulation element).

Therefore, the optical system 110 can be simplified, the costs can be reduced the reconstruction image has an appropriate image quality. Furthermore, a reconstruction image which has an appropriate image quality and in which the influence of noise is small can be obtained.

In addition, according to the present embodiment, the image pickup apparatus includes the optical system 110 and the image pickup device 120 for forming a first image, and the image processing device 140 for forming a final high-definition image from the first image.

The focal position of the optical system 110 is adjusted by the movement to a focal position corresponding to a predetermined object distance using a contrast of the object based on the image signal which is repeatedly detected through the optical system which includes an optical system and an optical wavefront modulation element 113 for modulating the optical transfer function (OTF). Accordingly, the focused state can be obtained by detecting the contrast in a region where the contrast is relatively high, and shooting at the predetermined object distance can be performed.

Furthermore, the kernel size and the operation coefficient used in the convolution operation are variable, and suitable kernel size and operation coefficient can be determined on the basis of the inputs from the operating unit 180 and the like. Accordingly, it is not necessary to take the magnification and defocus area into account in the lens design and the reconstructed image can be obtained by the convolution operation with high accuracy.

In addition, a natural image in which the object to be shot is in focus and the background is blurred can be obtained without using a complex, expensive, large optical lens or driving the lens.

The image pickup apparatus 100 according to the present embodiment may be applied to a small, light, inexpensive wavefront-aberration-control optical system for use in consumer appliances such as digital cameras and camcorders, and the like.

In addition, in the present embodiment, the image pickup apparatus 100 includes the optical system 110 and the image processing device 140. The optical system 110 includes the wavefront coding optical element for changing the wavefront shape of light that passes through the imaging lens 112 to form an image on the light-receiving surface of the image pickup device 120.

The image processing device 140 receives a first image FIM from the image pickup device 120 and subjects the first image to a predetermined correction process for lifting the MTF relative to the special frequency so as to obtain a final high-definition image FNLIM. Thus, there is an advantage in that a high-definition image can be obtained.

In addition, the structure of the optical system 110 can be simplified and the optical system 110 can be easily manufactured. Furthermore, the costs can be reduced.

In the case in which a CCD or a CMOS sensor is used as the image pickup device, the resolution has a limit determined by the pixel pitch. If the resolution of the optical system is equal to or more than the limit, phenomenon like aliasing occurs and adversely affects the final image, as is well known.

Although the contrast is preferably set as high as possible to improve the image quality, a high-performance lens system is required to increase the contrast.

However, aliasing occurs, as described above, in the case in which a CCD or a CMOS sensor is used as the image pickup device.

In the known image pickup apparatus, to avoid the occurrence of aliasing, a low-pass filter composed of a uniaxial crystal system is additionally used.

Although the use of the low-pass filter is correct, since the low-pass filter is made of crystal, the low-pass filter is expensive and is difficult to manage. In addition, when the low-pass filter is used, the structure of the optical system becomes more complex.

As described above, although images with higher definitions are demanded, the complexity of the optical system must be increased to form high-definition images in the known image pickup apparatus. When the optical system becomes complex, the manufacturing process becomes difficult. In addition, when an expensive low-pass filter is used, the costs are increased.

In comparison, according to the present embodiment, aliasing can be avoided and high-definition images can be obtained without using the low-pass filter.

In the optical system 110 according to the present embodiment, the optical wavefront modulation element 113 (wavefront coding optical element) is positioned closer to the object-side lens than the aperture. However, the optical wavefront modulation element 113 (wavefront coding optical element) may also be located at the same position as the aperture or at a position closer to the imaging lens than the aperture. Also in such a case, effects similar to those described above can be obtained.

According to the present disclosure, the structure of the optical system 110 can be simplified, and the costs can be reduced. In addition, a reconstruction image which has an appropriate image quality and in which the influence of noise is small can be obtained. Therefore, the image pickup apparatus 100 and the image processing method may be preferably used for a digital still camera, a mobile phone camera, a Personal Digital Assistant (PDA) camera, an image inspection apparatus, an industrial camera used for automatic control, and the like.

Although exemplary embodiments of the present invention have been described above with reference to the accompanying drawings, it is understood that the present invention is not limited to the above-described embodiments. Various alterations and modifications to the above embodiments are contemplated to be within the scope of the invention. It should be understood that those alterations and modifications are included in the technical scope of the present invention as defined by the appended claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While at least one exemplary embodiment has been presented in the foregoing detailed description, the present invention is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

What is claimed is:

1. A image pickup apparatus, comprising:
   an optical system;
   an optical wavefront modulation element operable to modulate an optical transfer function;
   an aperture stop located adjacent to the optical wavefront modulation element such that the following condition is satisfied:

$\phi \times D < 2$ mm$^2$, where $\phi$ [mm] is an aperture diameter of the aperture stop, and D [mm] is a distance between the aperture stop and the optical wavefront modulation element; and
   an image pickup device operable to pick up an object image that passes through the optical system and the optical wavefront modulation element,
   wherein, a phase of the optical wavefront modulation element is based on the following relationship:

$$z = \exp\left\{i \times \left(\sum_{j=1} C_j x^m y^n\right)\right\},$$

where z is the phase of the optical wavefront modulation element on an optical axis of the optical system and x and y are axes perpendicular to the optical axis and to each other, i is $\sqrt{-1}$, C is a coefficient value, m and n are integers, $$j = \frac{[(m+n)^2 + m + 3n]}{2}, |x| \leq 1, \text{ and } |y| \leq 1.$$

2. The image pickup apparatus according to claim 1, wherein a telecentricity of the aperture stop is maintained, and an outermost chief ray does not intersect an Fno ray in a space between the optical wavefront modulation element and the aperture stop.

3. The image pickup apparatus according to claim 2, wherein, an image-side telecentricity is maintained and the following condition is satisfied:

$0.5 < S1/S2 < 2.0$, where S1 is a first area surrounded by a first section of a shading curve of the image pickup device, an upper ray incident angle, and a chief ray incident angle, and S2 is a second area surrounded by a second section of the shading curve of the image pickup device, a lower ray incident angle, and the chief ray incident angle, wherein the shading curve comprises a relationship between a sensitivity of the image pickup device and a light ray incident angle.

4. The image pickup apparatus according to claim 1, wherein, an image-side telecentricity is maintained and the following condition is satisfied:

$0.5 < S1/S2 < 2.0$, where S1 is a first area surrounded by a first section of a shading curve of the image pickup device, an upper ray incident angle, and a chief ray incident angle, and S2 is a second area surrounded by a second section of the shading curve of the image pickup device, a lower ray incident angle, and the chief ray incident angle, wherein the shading curve comprises a relationship between a sensitivity of the image pickup device and a light ray incident angle.

5. The image pickup apparatus according to claim 4, wherein a telecentricity of the aperture stop is maintained and the following condition is satisfied:

$\phi/D < 1$, and $\alpha < 45°$, where $\alpha$ is an incident angle at which an outermost chief ray is incident on the aperture stop.

6. The image pickup apparatus according to claim 1, wherein a telecentricity of the aperture stop is maintained and the following condition is satisfied:

$\phi/D < 1$, and $\alpha < 45°$, where $\alpha$ is an incident angle at which an outermost chief ray is incident on the aperture stop.

7. The image pickup apparatus according to claim 1, wherein the optical wavefront modulation element is formed as a part of optical lenses.

8. The image pickup apparatus according to claim 1, further comprising means for generating an image signal with a smaller dispersion than that of a dispersed object-image signal that is obtained from the image pickup device.

9. A method of manufacturing an image pickup apparatus, the method comprising:
   providing an optical wavefront modulation element;
   providing an aperture stop; and
   locating the optical wavefront modulation element near the aperture stop such that the following condition is satisfied:

$\phi \times D < 2$ mm$^2$, where $\phi$ [mm] is an aperture diameter of the aperture stop, and D [mm] is a distance between the aperture stop and the optical wavefront modulation element;
   providing an optical system;
   wherein a phase of the optical wavefront modulation element is based on the following relationship:

$$z = \exp\left\{i \times \left(\sum_{j=1} C_j x^m y^n\right)\right\},$$

where z is the phase of the optical wavefront modulation element on an optical axis of the optical system and x and y axes are axes perpendicular to the optical axis and to each other,
   m and n are integers, i is $\sqrt{-1}$, C is a coefficient value, $$j = \frac{[(m+n)^2 + m + 3n]}{2}, |x| \leq 1, \text{ and } |y| \leq 1.$$

10. The method according to claim 9, further comprising providing an image pickup device.

11. The method according to claim 9, wherein a telecentricity of the aperture stop is maintained, and an outermost chief ray does not intersect an Fno ray in a space between the optical wavefront modulation element and the aperture stop.

12. The method according to claim 9, wherein an image-side telecentricity is maintained and the following condition is satisfied:

$0.5 < S1/S2 < 2.0$, where S1 is a first area surrounded by a first section of a shading curve of the image pickup device, an upper ray incident angle, and a chief ray incident angle, and S2 is a second area surrounded by a second section of the shading curve of the image pickup device, a lower ray incident angle, and the chief ray incident angle, wherein the shading curve comprises a relationship between a sensitivity of the image pickup device and a light ray incident angle.

13. The method according to claim 9, wherein a telecentricity of the aperture stop is maintained and the following condition is satisfied:

$\phi/D < 1$, and $\alpha < 45°$, where $\alpha$ is an incident angle at which an outermost chief ray is incident on the aperture stop.

14. The method according to claim 9, wherein the optical wavefront modulation element is formed as a part of the optical lenses.

* * * * *